(12) United States Patent
Goudy, Jr.

(10) Patent No.: US 8,625,253 B2
(45) Date of Patent: Jan. 7, 2014

(54) FLUID COOLED ELECTRICAL CAPACITOR AND METHODS OF MAKING AND USING

(75) Inventor: Paul R. Goudy, Jr., Bayside, WI (US)

(73) Assignee: Goudy Research, LLC, Waukesha, WI (US)

( * ) Notice: Subject to any disclaimer, the term of this patent is extended or adjusted under 35 U.S.C. 154(b) by 468 days.

(21) Appl. No.: 12/524,411

(22) PCT Filed: Jan. 25, 2008

(86) PCT No.: PCT/US2008/052033
§ 371 (c)(1),
(2), (4) Date: Jan. 12, 2010

(87) PCT Pub. No.: WO2008/092073
PCT Pub. Date: Jul. 31, 2008

(65) Prior Publication Data
US 2010/0134947 A1    Jun. 3, 2010

Related U.S. Application Data

(60) Provisional application No. 60/886,581, filed on Jan. 25, 2007.

(51) Int. Cl.
*H01G 4/002* (2006.01)
*H01G 4/04* (2006.01)

(52) U.S. Cl.
USPC ........................ 361/274.2; 361/327

(58) Field of Classification Search
USPC .............. 361/326–327, 274.1, 274.2, 274.3
See application file for complete search history.

(56) References Cited

U.S. PATENT DOCUMENTS

| | | | |
|---|---|---|---|
| 3,450,968 A * | 6/1969 | Cox | 361/318 |
| 3,956,614 A | 5/1976 | Hervert | |
| 5,009,763 A | 4/1991 | Hise | |

(Continued)

FOREIGN PATENT DOCUMENTS

| | | |
|---|---|---|
| DE | 10 81 570 B | 5/1960 |
| GB | 626 544 A | 7/1949 |

(Continued)

OTHER PUBLICATIONS

Office Action mailed Oct. 28, 2011, corresponding to U.S. Appl. No. 12/524,419, filed Nov. 13, 2009.

(Continued)

*Primary Examiner* — Eric Thomas
(74) *Attorney, Agent, or Firm* — Renner, Otto, Boisselle & Sklar, LLP

(57) ABSTRACT

A fluid cooled electrical capacitor assembly (10) includes a stack of honeycomb sheet-like structures (12) of dielectric material with an electrode (16) between each pair of honeycomb sheet-like structures. Alternate electrodes are electrically coupled together to each other and may be coupled to respective terminals of an electrical circuit. Fluid passages (20) in the honeycomb sheet-like structures provide a place for fluid (20a) to affect electrical characteristics of the capacitor assembly and/or to provide for cooling while preventing the fluid from contacting the electrodes. A method of assembling a capacitor assembly includes placing capacitor subunits including a dielectric honeycomb sheet-like structure and an electrode in parallel planar, overlying relation with the honeycomb. A method of cooling a capacitor assembly of dielectric honeycomb structure and electrodes includes directing a fluid through flow channels in the honeycomb structure.

8 Claims, 16 Drawing Sheets

(56) References Cited

U.S. PATENT DOCUMENTS

| | | | |
|---|---|---|---|
| 5,108,470 | A | 4/1992 | Pick |
| 6,805,732 | B1 | 10/2004 | Billiotte et al. |
| 6,828,800 | B2 * | 12/2004 | Reich et al. .................. 324/658 |
| 7,510,600 | B2 | 3/2009 | Ibe et al. |
| 2001/0043890 | A1 | 11/2001 | Son |
| 2003/0030374 | A1 | 2/2003 | Pai |
| 2005/0063879 | A1 | 3/2005 | Tsuji |
| 2005/0142047 | A1 | 6/2005 | Baik et al. |
| 2005/0270722 | A1 | 12/2005 | Gorczyca et al. |
| 2006/0127270 | A1 | 6/2006 | Deshpande |
| 2009/0165648 | A1 * | 7/2009 | Frank et al. ....................... 95/73 |
| 2010/0067164 | A1 | 3/2010 | Goudy, Jr. |
| 2010/0134947 | A1 | 6/2010 | Goudy, Jr. |

FOREIGN PATENT DOCUMENTS

| | | | |
|---|---|---|---|
| JP | 2002346324 A | * | 12/2002 |
| JP | 2003 340271 A | | 12/2003 |
| JP | 2004 340049 A | | 12/2004 |
| JP | 2006 002983 | | 1/2006 |
| JP | 2006 161595 A | | 6/2006 |
| WO | WO 2005/083241 A | | 9/2005 |
| WO | 2008092083 A3 | | 7/2008 |
| WO | 2008092089 | | 7/2008 |
| WO | WO 2008/092073 A2 | | 7/2008 |
| WO | WO 2008/092083 A2 | | 7/2008 |
| WO | WO 2008/092089 A1 | | 7/2008 |

OTHER PUBLICATIONS

Office Action, dated Mar. 21, 2011, in U.S. Appl. No. 12/524,419, filed Nov. 13, 2009.
Office Action, dated Oct. 28, 2011, in U.S. Appl. No. 12/524,419, filed Nov. 13, 2009.
International Search Report for corresponding International Application No. PCT/US2008/052033, date of mailing Oct. 16, 2008, and Written Opinion.
International Search Report for corresponding International Application No. PCT/US2008/052057, date of mailing Aug. 28, 2008, and Written Opinion.
International Search Report for corresponding International Application No. PCT/US2008/052069, date of mailing May 28, 2008, and Written Opinion.

* cited by examiner

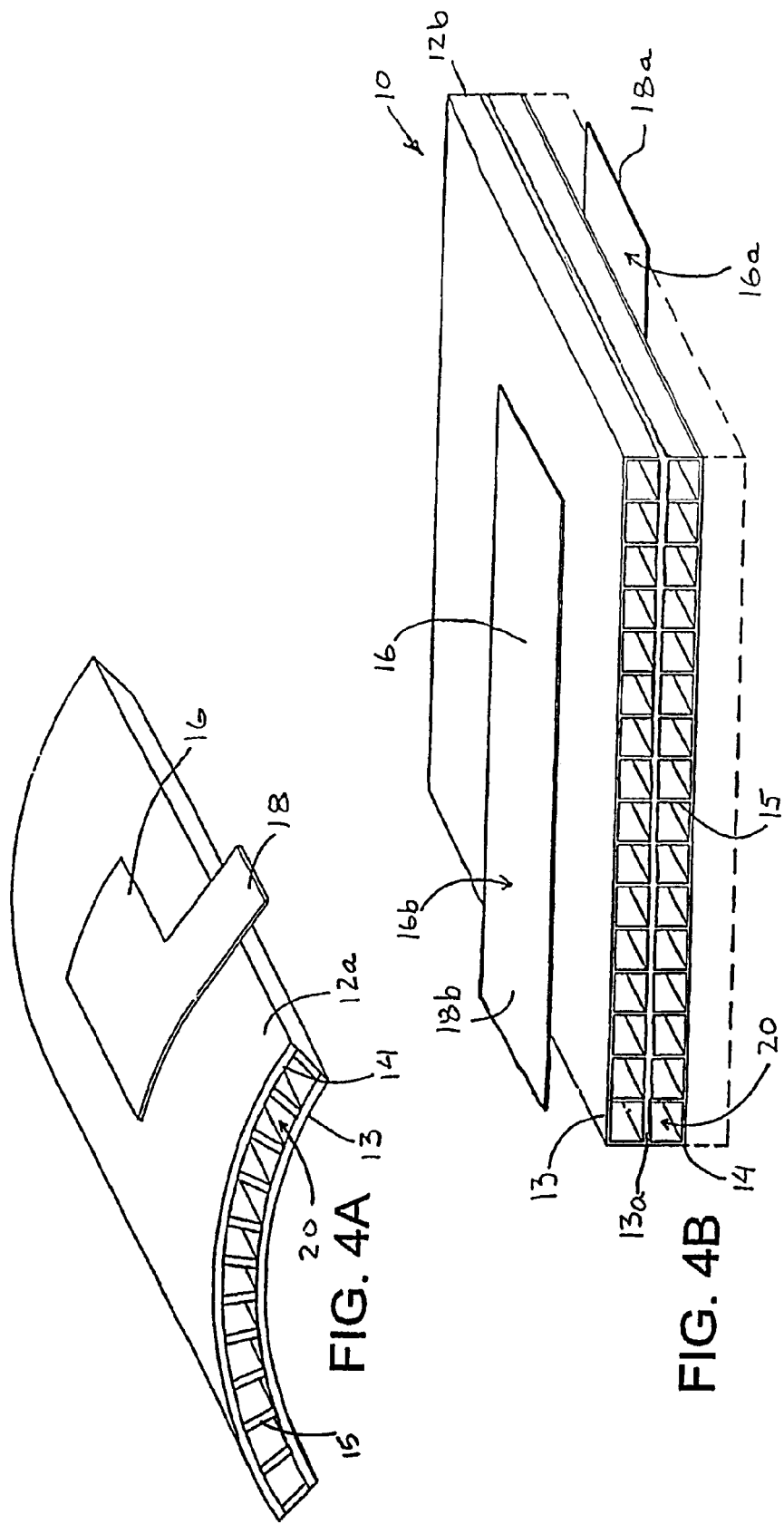

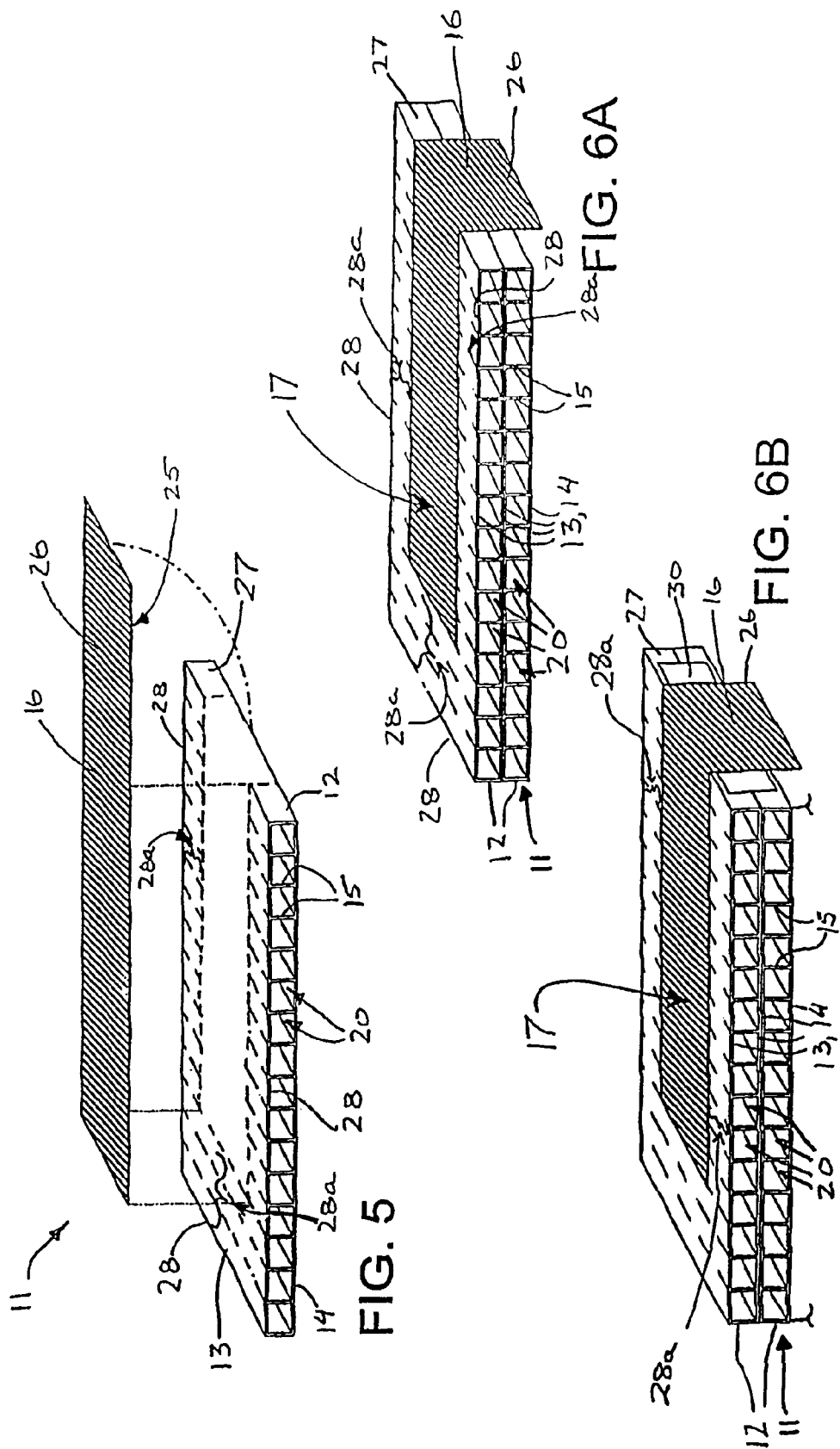

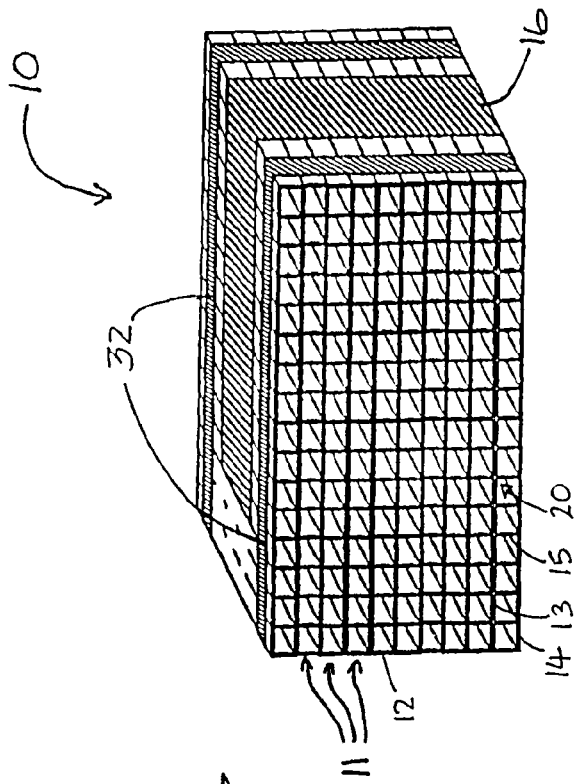
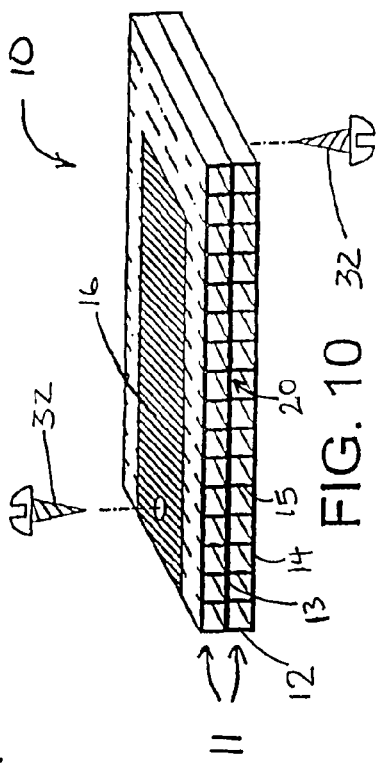
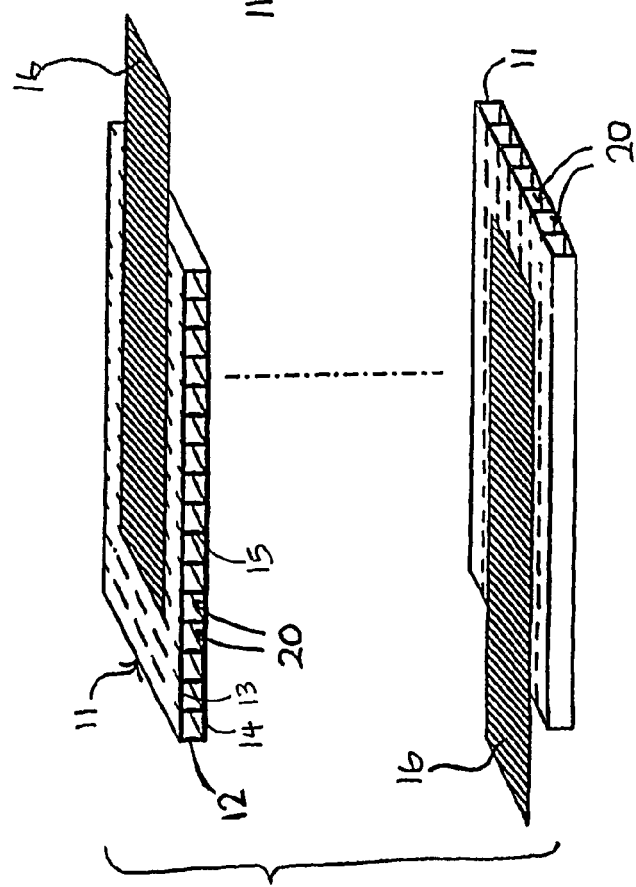
FIG. 9
FIG. 10
FIG. 8

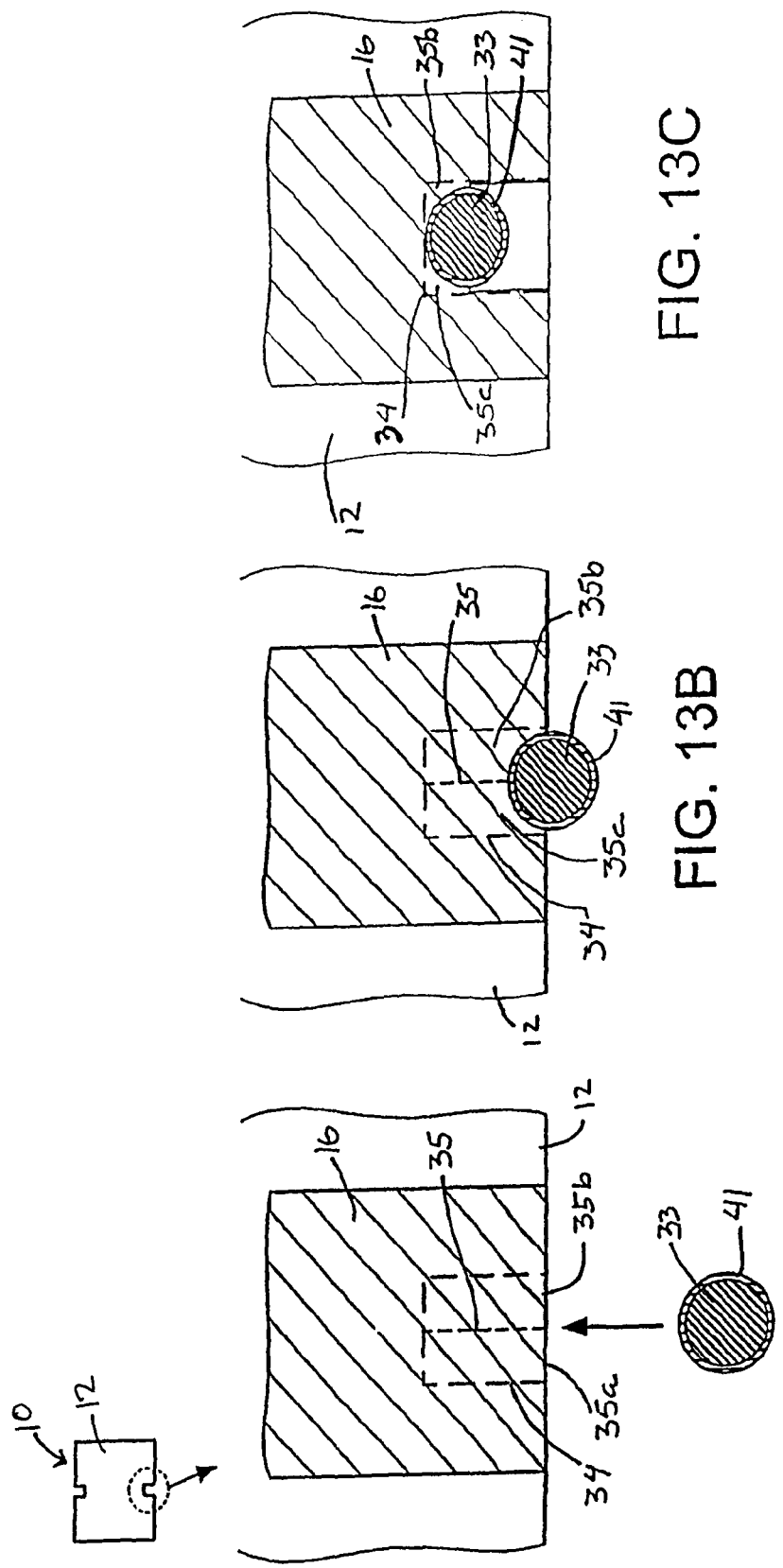

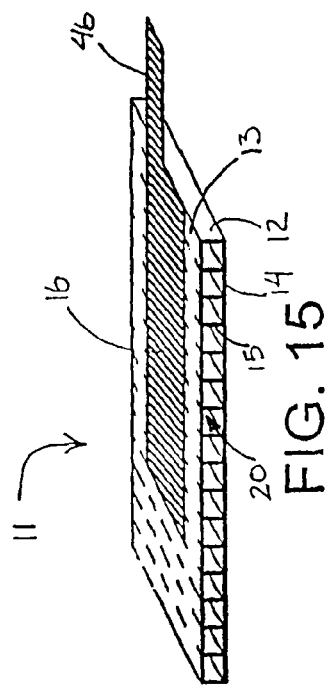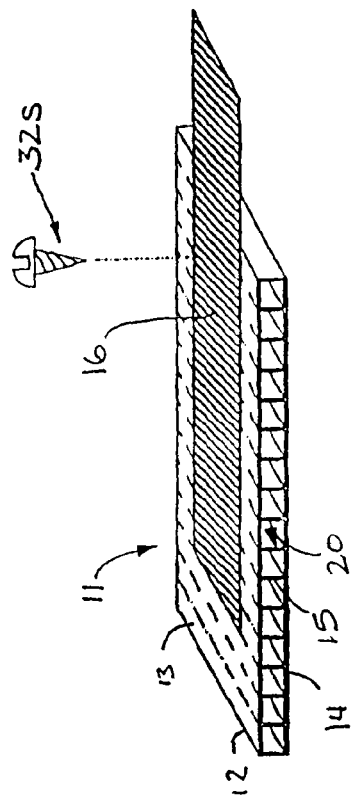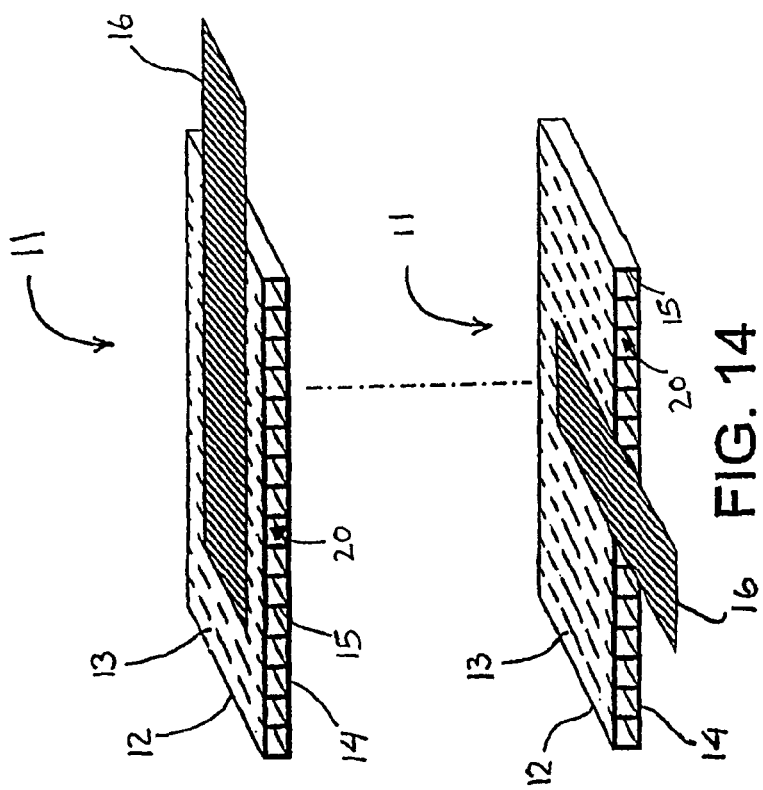

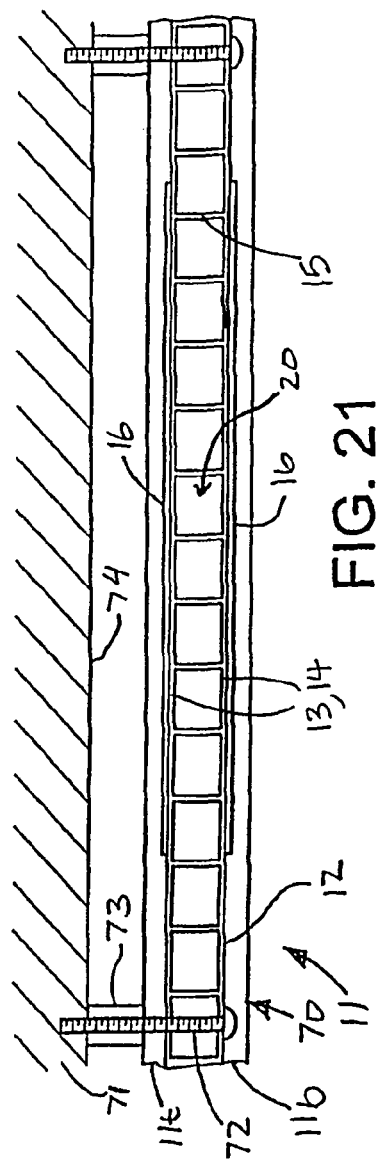
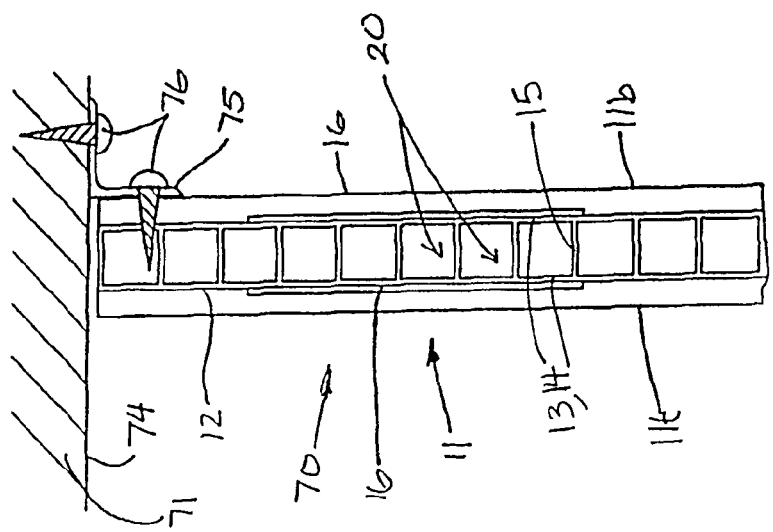
FIG. 21
FIG. 22

FLUID COOLED ELECTRICAL CAPACITOR AND METHODS OF MAKING AND USING

CROSS-REFERENCE TO RELATED APPLICATION

This application claims the benefit of U.S. Provisional Patent Application Ser. No. 60/886,581, filed Jan. 25, 2007, the entire disclosure of which is hereby incorporated by reference.

TECHNICAL FIELD

The present invention relates generally to the field of electrical capacitors, and more particularly, to a fluid cooled electrical capacitor and methods of making and using a fluid cooled electrical capacitor.

BACKGROUND

Capacitors are prevalent in a wide variety of industries and applications. A known problem with standard capacitors, and with high voltage capacitors in particular, is the generation of corona, sometimes referred to as corona discharge, which may lead to failure of the dielectric in the capacitor and, thus, failure of the capacitor. Another problem with standard high voltage capacitors is the generation of heat due to corona, due to high frequency operation of the capacitor, or for some other reason; heat may cause deterioration of the capacitor dielectric, also leading to capacitor failure.

Corona and the accompanying generation of ultra-violet (UV) light may degrade the dielectric used in capacitors, also leading to premature failure. For example, corona discharge and UV light may cause the crystallization of glass and the breakdown of certain polymers used in the manufacture of dielectrics for capacitors.

To reduce corona generation and its accompanying negative effects, it is known in the art that a capacitor may be immersed in a fluid (e.g., oil) to exclude ionizable fluid or gases from the areas and/or surfaces subject to corona generation. A fluid such as oil also may be used to cool a capacitor. The oil also may be used as a self-healing component to eliminate air bubbles; eliminating air bubbles avoids the generation of corona.

One problem with using a liquid (e.g., oil) to cool capacitors and to prevent corona generation, is that the addition of fluid increases the weight of the capacitor. Another problem results from the need to stabilize the fluid to prevent breakdown and/or oxidation of the fluid. One method of stabilization has been achieved through the addition of polychlorinated biphenyls (PCB's) to the oil. The perceived negative health and environmental implications of these additions have made oil leakage from such a capacitor and disposal of the oil an additional concern.

There is an increasing need in the art for an alternative method of cooling capacitors.

In some instances, there also is a need for reducing and/or preventing corona discharge in capacitors and the associated negative effects.

There is a need for inexpensive and environmentally friendly self-healing dielectric for capacitors.

SUMMARY OF THE INVENTION

According to one aspect of the invention, a capacitor assembly includes at least two dielectric sheets, at least one flow through channel between the sheets, and a respective electrical conductor associated with each of the sheets and separated from the channel(s) by the respective associated sheet.

Another aspect relates to a capacitor formed of dielectric honeycomb material and a pair of electrodes.

Another aspect relates to use of the combination of honeycomb material and a fluid in the honeycomb material as a dielectric in a capacitor.

Another aspect relates to a capacitor subunit including a dielectric honeycomb, and an electrical conductor on at least one dielectric sheet of the dielectric honeycomb.

Another aspect relates to a capacitor assembly including a stack of a plurality of capacitor subunits wherein an electrical conductor of at least one capacitor subunit is cooperative with an electrical conductor of another capacitor subunit to function as a capacitor.

Another aspect relates to a method of making a capacitor subunit including disposing a conductive material on at least one dielectric sheet of a dielectric honeycomb.

An aspect of the invention relates to an assembly including at least two dielectric sheets, at least one flow through channel between the sheets, and an electrical conductor associated with one of the sheets and separated from the channel by that sheet.

Another aspect relates to a capacitor subunit including a dielectric honeycomb, and an electrical conductor at at least one dielectric sheet of the dielectric honeycomb.

Another aspect relates to a capacitor including a plurality of capacitor subunits, which include a dielectric honeycomb, and an electrical conductor at at least one dielectric sheet of the dielectric honeycomb, and wherein the electrical conductor of a first capacitor subunit is separated from the electrical conductor of the adjacent capacitor subunit by the dielectric honeycomb of one of the capacitor subunits.

Another aspect relates to a capacitor including a dielectric honeycomb material having a plurality of fluid flow channels therein and an electrode at each surface of the honeycomb material and separated from the fluid flow channels.

Another aspect relates to an electric capacitor, including a honeycomb dielectric having respective opposed, generally parallel support surfaces, and a number of fluid passages in the honeycomb dielectric between the support surfaces, and an electrical conductor at each of the support surfaces, and the electrical conductors having respective portions that are in generally parallel, overlapping, confronting relation separated by the honeycomb dielectric to provide electrical capacitance.

Another aspect relates to a capacitor including a non-uniform density dielectric support having respective parallel surfaces, a pair of electrical conductors, one at one of the parallel surfaces and one at the other of the parallel surfaces and relatively positioned to provide electrical capacitance, and cooling means in the non-uniform density dielectric support.

Another aspect relates to a capacitor including electrodes, and a dielectric support for the electrodes adapted to provide directed fluid cooling of the electrodes without the cooling fluid contacting the electrodes.

Another aspect relates to a method of cooling a capacitor that includes electrodes, including thermally coupling cooling fluid with the electrodes for substantially uniform cooling thereof without contact of the cooling fluid with the electrodes.

Another aspect relates to a method of making a capacitor subunit including disposing a conductive material at least one dielectric sheet of a dielectric honeycomb.

Another aspect relates to a method of making a capacitor including assembling a plurality of the capacitor subunits that include conductive material disposed at at least one dielectric sheet of a honeycomb, wherein a dielectric sheet of a first capacitor subunit is placed adjacent a dielectric sheet of a second capacitor subunit with an electrode of one of the capacitor subunits between such dielectric sheets.

Another aspect relates to a method of operating a capacitor having a number of electrodes separated by dielectric sheets that are spaced apart by ribs providing fluid flow passages between the dielectric sheets, wherein alternating current voltage is applied to the capacitor, including directing a cooling fluid flow through the fluid flow passages.

Another aspect relates to a method of cooling a capacitor formed of a honeycomb material having respective sheet-like surfaces and a number of fluid flow channels through the honeycomb material between the surfaces, and an electrode at each surface of the honeycomb material, including directing a flow of fluid through a number of the fluid flow channels.

Another aspect relates to a method of providing a dielectric to a capacitor formed of a honeycomb material having respective sheet-like surfaces and a number of fluid flow channels through the honeycomb material between the surfaces, and an electrode at each surface of the honeycomb material, including directing a flow of fluid through a number of the fluid flow channels.

Another aspect relates to a method of operating a capacitor including at least a pair of spaced-apart electrodes and a fluid flow channel between the electrodes, including directing fluid flow through the fluid flow channel to cool the capacitor without contacting the electrodes, said directing comprising providing fluid to affect dielectric characteristics of the capacitor.

Another aspect relates to a capacitor, including a pair of dielectric sheet-like members, one or more fluid channels between the sheet-like members, electrodes respectively at each sheet-like member separated from the fluid channels as not to contact fluid therein, and wherein the sheet-like members and fluid in the channel(s) are a dielectric between the electrodes of the capacitor.

These and further features of the present invention will be apparent with reference to the following description and attached drawings. In the description and drawings, several exemplary embodiments of the invention have been disclosed in detail as being indicative of some of the ways in which the principles of the invention may be employed, but it is understood that the invention is not limited to those. Rather, the scope of the invention is determined by the claims and all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

These and further features of the present invention will be apparent with reference to the following description and drawings, wherein:

FIG. 4A is a schematic isometric view of a non-planar capacitor subunit;

FIG. 4B is a fragmentary isometric view of a capacitor assembly using tri-wall honeycomb structure;

FIG. 5 is an exploded isometric view of a capacitor subunit;

FIG. 6A is an isometric view of two capacitor subunits of FIG. 5 assembled;

FIG. 6B is an isometric view of the two capacitor subunits of FIG. 5 assembled with an insulator installed on the edges between two honeycomb dielectric sheets;

FIG. 8 is a schematic illustration of a number of capacitor subunits to depict an alternative method of assembling capacitor subunits to make a capacitor assembly;

FIGS. 9 and 10 are isometric views illustrating respective capacitor assemblies assembled using different respective fastening mechanisms;

FIGS. 13A-13E are schematic illustrations of a connection mechanism of a capacitor assembly depicting alternative methods of assembling a number of capacitor subunits;

FIG. 14 is an exploded schematic isometric view of two capacitor subunits depicting an alternative method of assembling a number of capacitor subunits to make a capacitor assembly;

FIG. 15 is an isometric view of a capacitor subunit having a shaped conductive tab electrode;

FIG. 16 is an isometric view of a capacitor subunit having a conductive paint electrode;

FIGS. 21 and 22 are schematic illustrations of a capacitor assembly using the honeycomb structure thereof as lateral and vertical structural supports, respectively, to support the capacitor assembly from another supporting device, such as a wall, ceiling, etc.

DESCRIPTION

Figure 1A:
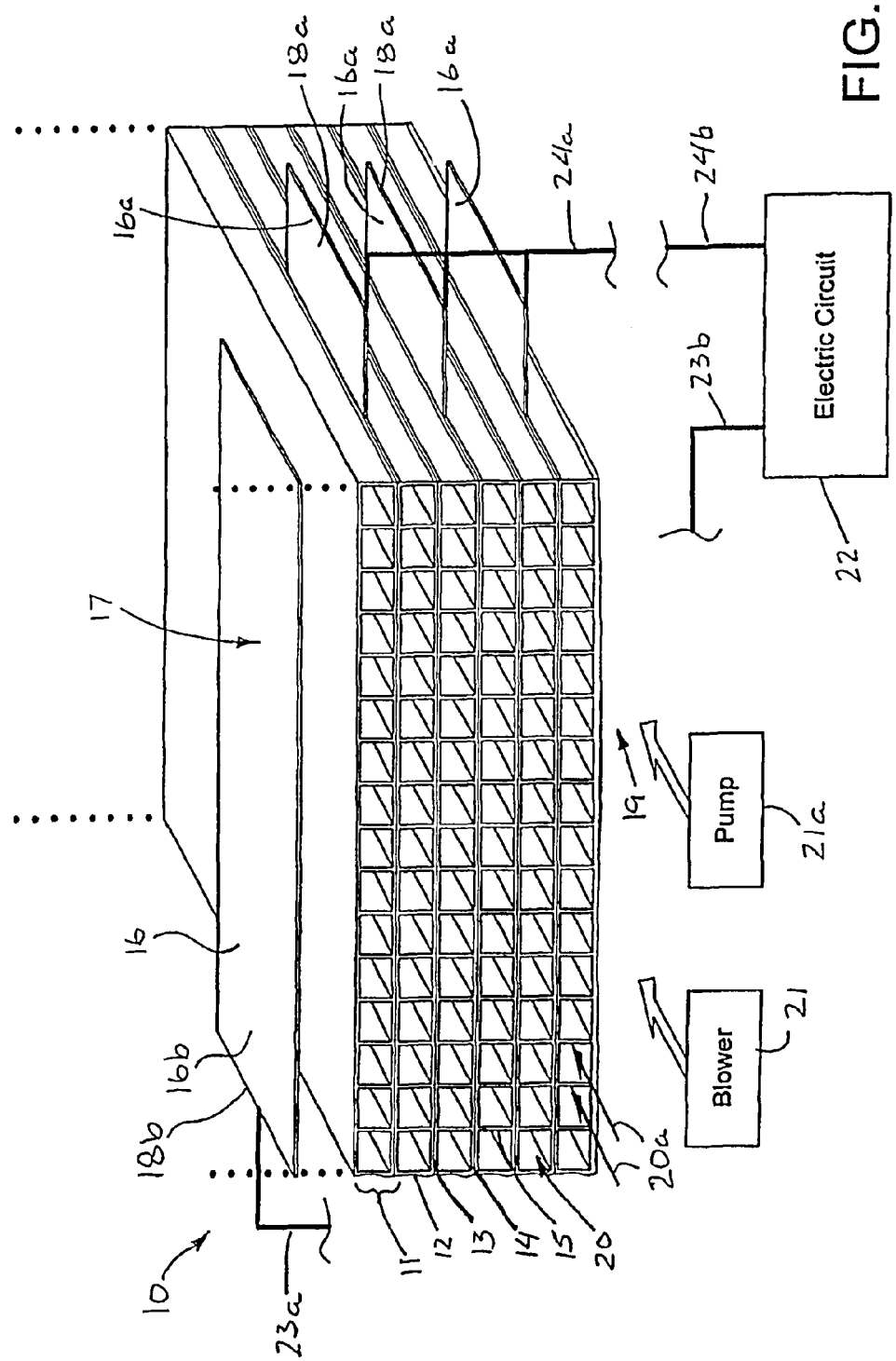
FIG. 1A is an isometric view of a capacitor assembly in an overall system according to an embodiment of the present invention.

The present invention will now be described with reference to the drawings, wherein like reference numerals are used to refer to like elements throughout. Primed reference numerals may be used to designate parts similar to those designated by the same unprimed reference numeral. It will be understood that the figures are not necessarily to scale and that directions may be mentioned for convenience of the description, but are not necessarily limiting or required.

Figure 1B:
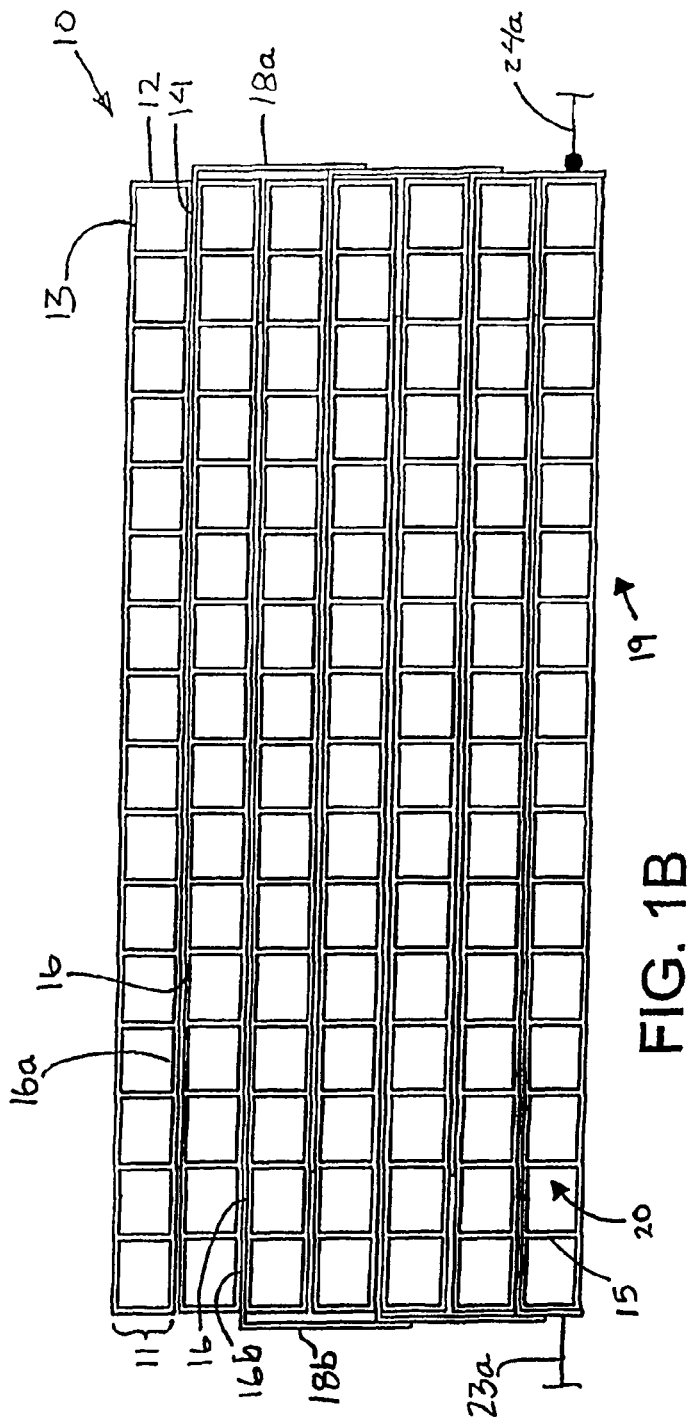
FIG. 1B is a schematic elevation view of the capacitor assembly of FIG. 1A showing exemplary electrical connections of respective electrodes.

Referring initially to FIGS. 1A and 1B (collectively referred to as FIG. 1), a capacitor assembly 10 according to an embodiment of the present invention is illustrated. As is described more fully below, a single capacitor includes a pair of dielectric sheets, one or more fluid channels between the sheets, and electrodes respectively at the dielectric sheets, e.g., attached thereto or spaced apart therefrom but in relatively close proximity thereto. The electrodes generally are separated from the channels so as not to contact the fluid therein. The sheets and fluid are a dielectric between the electrodes. The capacitor assembly may include a plurality of such capacitors, for example, arranged in stacked relation, and electrodes may be shared by two capacitors, as is described in greater detail below.

As is seen in FIG. 1, the capacitor assembly 10 includes a number of capacitor subunits 11, which are assembled in a stacked relation. The capacitor subunits 11 are formed of a honeycomb structure 12 (sometimes referred to as honeycomb) that has a pair of generally planar dielectric sheets 13, 14 separated by dielectric separators 15, which may be referred to below as "ribs" or as "supports." The honeycomb structure 12 is electrically non-conductive, e.g., made of dielectric material. In addition to a honeycomb structure 12, a capacitor subunit 11 also includes an electrode 16. As is illustrated, capacitor subunits are stacked together, and an electrode 16 is between respective relatively adjacent honeycomb structures 12. Being spaced apart by honeycomb structures 12, respective pairs (or more) of electrodes 16 may provide a capacitive effect, e.g., a capacitance, and sometimes will be referred to below as a capacitor 17. Accordingly, in assembled relation of capacitor subunits 11 to form the capacitor assembly 10, respective pairs of electrodes 16, which are separated by a honeycomb structure 12, function as capacitors 17. Electrodes between adjacent honeycomb structures may be shared in respectively adjacent capacitors so only one electrode may be needed for each capacitor subassembly in the stack. The capacitors 17 may be combined to provide a larger capacitance function of the capacitor assembly 10, e.g., as a stack of capacitors. The honeycomb structure may provide for controlled and relatively accurate spacing of the electrodes at each surface of a respective honeycomb to provide for relatively accurate control of the capacitance of the capacitor assembly 10.

Dotted lines at the top of FIG. 1A indicate that top and base pieces (described below) or more capacitor subunits may be included in the capacitor assembly 10. In FIG. 1B the topmost honeycomb structure 12 does not have an upper electrode and may serve as the top of the capacitor assembly 10; the bottom of the capacitor assembly may be similar to the top in that sense. As is seen in FIG. 1, several of the electrodes 16 may be electrically connected to each other. For example, with several capacitor subunits 11 in the capacitor assembly 10, the electrodes 16a may be electrically connected together and the electrodes 16b (only one of which is seen in FIG. 1) may be electrically connected together. In operation of the capacitor assembly 10 to provide capacitance, the electrodes 16a are at the opposite polarity from the electrodes 16b. In the illustration of FIG. 1, tab portions 18a of electrodes 16a extend beyond an edge of honeycomb structures 12. As shown in FIG. 1B, the tab portions 18a, 18b are folded or bent into engagement to make the electrical connection thereof with other respective tab portions 18a, 18b. These electrical tab portions 18a, 18b may connect the capacitor assembly 10 in an electrical circuit 19.

A number of flow through channels 20 (sometimes referred to as passages, paths, pathways, flow channels, fluid channels, channels or the like) are in respective honeycomb structures 12 of the capacitor subunits 11. The flow-through channels may provide for cooling or other purpose, as is described below. There may be only one channel 20 or, as is illustrated in a number of the exemplary embodiments, there may be a plurality of channels 20 in a capacitor subunit 11. The channels 20 of a capacitor subunit 11 may be the space between the sheets 13, 14 and the ribs 15 of the honeycomb structure 12 of the capacitor subunits. The ribs 15 separate the dielectric sheets 13, 14 from each other and divide the space between the dielectric sheets 13, 14 into respective flow channels. The ribs 15 and dielectric sheets 13, 14 may be, for example, integrally formed as a single structural unit or several parts thereof may be separately formed and assembled to make the honeycomb structure 12.

A respective channel 20 may be fluidically isolated from some or all of the other channels 20, or it may be connected to one or more other channel(s), e.g., by an opening in a rib 15 between adjacent channels. A fluid 20a may be disposed in or passed through one or more of the channels 20, for example, to effect cooling of a capacitor subunit 11, to affect capacitance of the capacitor subunit, or for other purposes. The honeycomb structure 12 and fluid 20a in the channels 20 provide a (or the) dielectric between respective electrodes of capacitors 17 in the capacitor assembly 10.

In FIG. 1, as an example, a fan or blower 21 blows fluid, for example, air or other gas 20a, toward the capacitor assembly 10, through the channels 20 of respective capacitor subunits 11, and out of the capacitor assembly 10. Alternatively, the fluid 20a may be a liquid, e.g., oil, a polymer or another liquid, which may be in the channels or may be flowed through them, e.g., by a pump 21a.

Figure 1C:
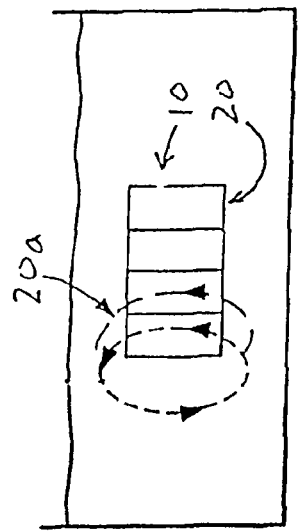
FIG. 1C is a schematic illustration of a capacitor assembly suspended in a fluid and undergoing convection cooling.

As is illustrated in FIG. 1C, if desired, flow of gas or liquid 20a through the channels 20 may be provided by convection; as an example, with channels 20 in vertical orientation a chimney effect may occur whereby warmer fluid rises and flows through the channels.

As an example of operation of a capacitor assembly 10 of FIG. 1, the electrodes 16a, 16b may be connected to an electric circuit or component, e.g., as is shown at 22, of the electrical circuit 19. Terminals, wire connections, etc. 23a, 24a electrically couple the capacitor assembly 10 to the electric circuit 22 via respective terminals, wire connections, etc. 23b, 24b, to function as a capacitor in the electrical circuit 19. The capacitance of the capacitor assembly 10 may depend on, for example, the number of capacitor subunits 11, the size and shape of the capacitor subunits 11 and parts thereof, the size, shape and relative location of respective electrodes 16, the material used to form the electrodes 16, spacing of the electrodes as provided by the thickness of the dielectric honeycomb structure 12, electrical or dielectric characteristics of the honeycomb structures 12 and the fluid(s) in channels 20, the electrical connections 23a, 24a of electrodes 16, to respective terminals or the like 23b, 24b of the electric circuit 22, the voltage applied to or by the electric circuit, environmental conditions, or other variables. During operation of the capacitor assembly 10, the fluid 20a in the channels 20 may affect capacitance.

An example of operating capacitor assembly 10: An electrical voltage is applied across the electrodes 16a, 16b. The honeycomb structure supports the electrodes in parallel, spaced apart, and at least partially overlapping relation. The capacitor assembly 10 may operate as a standard electrical capacitor operates. During normal operation, if desired, the capacitor assembly 10 may be cooled by fluid 20a that may be blown or pumped through the channels 20. The fluid 20a cools the capacitor assembly and respective parts thereof. The honeycomb structure 12 and the fluid 20a provide a dielectric for the capacitors 17 of the capacitor assembly 10. The honeycomb structure maintains separation of the fluid 20a from the electrodes 16 so that the fluid does not contact the electrodes while permitting thermal transfer from the electrodes via the honeycomb structure to the fluid. Thus, the fluid and the electrodes are thermally coupled. The fluid 20a may be freshly supplied to the capacitor assembly 10 from a separate source, e.g., ambient air, oil storage supply, etc.; and/or the fluid may be recirculated or recycled, possibly after first undergoing treatment, for example, to cool it, to ground it to remove any excess charge, and/or to dry it.

As is described in greater detail below, if a circumstance were to occur that the capacitor assembly 10 becomes hotter than desired for desired operation, for example, due to the input electrical voltage thereto having at least a portion that exceeds the break down voltage of dielectric of the capacitor assembly or due to a high frequency input electrical voltage, the fluid may be used not only to cool the capacitor assembly but also to tend to blow out from a channel a corona discharge or the electron leakage at the start of a corona discharge buildup thereby to avoid break down of the dielectric. Such capabilities of the capacitor assembly 10 lead to a robust apparatus. Also, as will be appreciated, a number of capacitor assemblies 10 may be used together to increase the capacitance characteristics thereof and of the electrical circuit in which used. The capacitor assembly 10 is modular in that several may be used together; also the capacitor subunits 11 are modular in that more or fewer may be used in a capacitor assembly.

Figure 3:
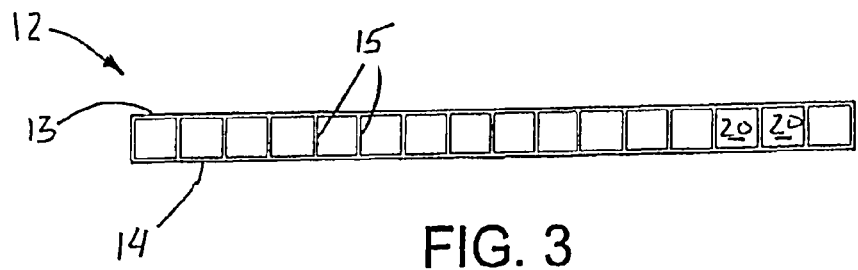
FIG. 3 is an exemplary front elevation view of the honeycomb material of FIG. 2 (the rear elevation view may be the same)
Figure 2:
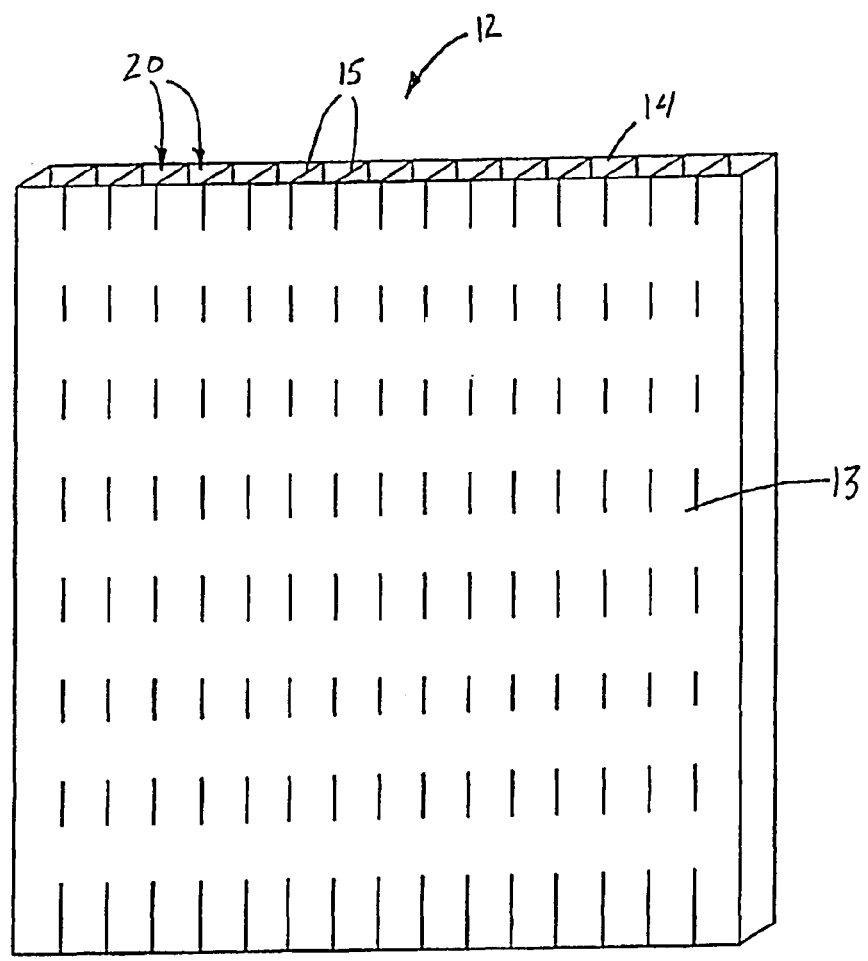
FIG. 2 is an isometric view of honeycomb material used in the capacitor assembly of FIG. 1.

Referring now to FIGS. 1-3, an example of honeycomb structure 12 used in the capacitor assembly 10 of FIG. 1 is shown. The honeycomb structure 12 is a multi-wall honeycomb and includes at least two substantially parallel and at least partially overlapping dielectric sheets 13, 14 that are separated by at least two dielectric ribs 15. One or more flow through channels 20 are in the honeycomb structure 12. For example, the sheets 13, 14 and a pair of the ribs 15 may define at least one flow through channel 20; and with more than two ribs 15, there may be more than one flow channel 20 as illustrated.

In an embodiment of the invention there are a number of channels 20 and they are relatively deep, e.g., much longer than the smaller of the respective cross sectional dimensions thereof, which straightens fluid flow and thus promotes laminar flow through the channels. In the illustrated embodiment of FIG. 1, for example, the length of the channels 20 is much longer than both cross sectional dimensions of the channels. As a non-limiting example, the length of a channel may be greater than about four times the smaller cross sectional dimension of the channel. Also, in an embodiment the cross sectional shape and dimensions of each of the channels in the honeycomb are approximately the same, which promotes uniform distribution of fluid to and through the channels. Laminar flow promotes even (e.g., substantially uniform) heat removal and avoids the occurrence of or eliminates hot spots along the channels; and the substantially uniform fluid distribution helps to maintain substantially uniform temperature of the capacitor assembly.

In the illustrated capacitor assembly 10 the flow channels 20 are of substantially the same cross sectional size and shape and substantially the same length. This shape, size, length and arrangement helps to assure substantially equal flow of fluid through the flow channels or containment of fluid therein for substantially uniform cooling, substantially uniform electrical characteristics, etc. over the area of each respective capacitor 17, capacitor subunits 11 and the capacitor assembly 10, as may be desired.

The honeycomb structure 12 may be made from electrically non-conductive material, e.g., glass, ceramic, clay, plastic, thermoplastic, polymer, acrylic, polycarbonate, polypropylene, polyethylene, phenolic, etc. or the like. The honeycomb structure 12 may be made by any suitable method (e.g., extrusion, molding, machining, etc.). A suitable commercial example of honeycomb structure 12 is manufactured by GALLINA USA LLC of Janesville, Wis., USA and is sold under the trademark or designation "POLYCARB." The sheets, which are generally parallel to the electrode 16, may be twin-wall, e.g., two layer form, as is illustrated in FIGS. 2 and 3 in which dielectric sheets 13, 14 are respective layers, or may be more than two layers, e.g., three layers 13, 13a, 14 as shown in FIG. 4B, or more.

The electrodes 16 of capacitor subunits 11 are on or at the external surface of a dielectric sheet 13, 14, i.e., not the internal surface of the dielectric sheet that faces directly into or forms channels 20. For a stack of capacitor subunits 11 that form the capacitor assembly 10, it will be appreciated that two electrodes 16a, 16b adjacent a respective honeycomb structure 12 are at the external surfaces of dielectric sheets 13, 14 thereof and those electrodes are relatively uniformly spaced apart from each other over their area by the honeycomb structure 12. Those electrodes 16 are not in the channels 20 and do not make contact with the fluid in the channels. The electrode 16 between two directly adjacent capacitor subunits 11 may be shared to provide capacitance with the two other electrodes at the relatively remotely opposite dielectric sheets of those capacitor subunits, as is illustrated.

As a non-limiting example, for use with alternating current (AC) voltages in the range of from about 600 volts to about 15,000 volts rms, a thickness of the honeycomb structure 12 may be approximately 6 millimeters as measured between the external surfaces of the sheets 13, 14. Exemplary cross sectional size of the channels 20 for such honeycomb may be about 3/16 inch by about 3/16 inch. A smaller size honeycomb structure material from GALLINA USA LLC is 4.5 millimeter thick and may be used, but the smaller cross sectional size channels 20 may cause undesirable back pressure opposing the fluid flow therethrough and also may impede uniformity of fluid flow. Larger size honeycomb structures also are available and may be used.

The sizes and other values expressed herein are examples; others may be used depending on various requirements of the capacitor assembly.

Another example of coextruded twin wall (two layers) polycarbonate sheet material useful as the honeycomb structure 12 is sold under the trademark MAKROLON by Sheffield Plastics Inc. of Sheffield, Mass.; and other honeycomb structures are available from TAP Plastics, Inc. and COEX Corporation of Wallyford, Conn. LEXAN polycarbonate material sold by General Electric Company also may be used for the honeycomb structure 12.

An advantage to using polycarbonate material for the honeycomb structure 12 is that it does not support combustion. The cooling provided by fluid in the channels, e.g., air flow or some other fluid flow, and the tendency for the honeycomb structure to not be combustible, tends to enhance safe operation of the capacitor assembly 10, even at high voltage and/or high frequency operating conditions or uses. Although the capacitor assembly 10 would function as a capacitor at many different voltages, the capacitor assembly is useful at relatively high input AC voltages, e.g., from about 600 volts to about 15,000 volts rms or even higher or lower voltages. The capacitor assembly also is operative at many different frequencies, even for direct current (DC) circuits; exemplary frequencies are in the range of from about 60 Hertz to about 120 Hertz, but other frequencies may be used. The capacitor assembly also is operative with direct current (DC) input voltage or pulsed DC voltage. In capacitors usually the higher the frequency, the more heat produced. Thus, cooling provided the capacitor assembly 10 is advantageous at high voltages and at high frequencies. The values mentioned herein are exemplary only and are not intended to be limiting.

A honeycomb structure 12 with ribs 15 providing walls separating respective flow channels 20 prevents an inadvertent or unintended corona within the cooling fluid of a fluid channel from spreading to another fluid channel. This helps to maintain the dielectric integrity of the fluid.

The honeycomb structure 12 is available in a number of thicknesses and colors. Some readily available thicknesses include, for example, 4 mm, 6 mm, 8 mm and 10 mm, as measured between the exteriors of the respective sheets 13, 14. Other thicknesses also are possible. The honeycomb structure may be colored or clear. An exemplary honeycomb structure 12 is a clear UV stabilized polycarbonate. The honeycomb structure 12 is available in large sheets and may be cut to desired dimensions. Exemplary standard sheets of the described honeycomb material are available in 4 feet by 8 feet sheets; extended lengths of 20 feet or more may be available. An example of cross-sectional size of the honeycomb structure 12 for the capacitor assembly 10 is 6 inches by 6 inches; however, such sizes are not limiting and it will be appreciated that other sizes may be used.

The dielectric sheets 13, 14 may be planar or substantially planar, e.g., as is shown in FIGS. 1-3, or may be non-planar, e.g., curved as in the illustration of honeycomb structure 12a of FIG. 4A. The dielectric sheets 13, 14 of the honeycomb structure 12 are relatively uniformly separated by the ribs 15. The capacitor assembly 10 usually will function best, e.g., substantially uniformly, with the electrodes 16 of respective sheets 13, 14 substantially uniformly spaced apart. By spacing the electrodes 16 uniformly, capacitance is maximized and is uniform, and stress points that would lead to break down of the fluid dielectric 20a in the channels 20 are minimized or eliminated. By eliminating stress points at which the dielectric fluid in channels 20 may break down and lead to corona discharge that would produce ultraviolet light, the materials used to form the honeycomb and the electrodes would experience less failure due to thermal and/or UV breakdown.

Substantially uniform spacing of the dielectric sheets 13, 14, and substantially uniform spacing of the ribs 15, and, if possible, spacing of the ribs such that the cross section dimensions of the channels 20 are about the same, which together tend to yield uniform channels 20, leads to substantially even fluid flow and substantially uniform cooling effect. Eliminating electrical stress points tends to minimize single point breakdown in the structure, e.g., corona discharge, and this combination with uniform cooling tends to provide an arc or corona quenching effect, e.g., the blowing out of an electric arc or corona discharge, and tends to maintain even temperatures that protect the material, e.g., plastic or polymer, of which the honeycomb structure 12 is made.

It will be appreciated that the combination of the fluid 20a in the fluid flow channels together with the honeycomb structure 12 is the dielectric for the capacitor 17 formed by each stack of two capacitor subunits 11. The fluid is directed through the channels 20 between the spaced apart electrodes 16 without contacting the electrodes. The fluid cools the capacitor. The directing of the fluid affects dielectric characteristics of the capacitor. For example, if the fluid is provided at a sufficiently fast rate to blow out from a channel a corona discharge or the electron leakage at the start of a corona discharge buildup, the dielectric value of the fluid and, thus, of the combination dielectric of the fluid and honeycomb, would be somewhat greater as compared to a lower dielectric value if a corona discharge or electron leakage were occurring in a channel generating ions and freeing electrons in the channel. Other possibilities of controlling dielectric characteristics of the capacitor via the fluid would be to control the moisture content of a gaseous fluid, control the temperature of the fluid, and/or determine what are the constituents of the fluid, e.g., whether the fluid is or contains oxygen, nitrogen, helium, etc.

In the exemplary embodiments illustrated, honeycomb structure 12 with substantially parallel, substantially planar, and overlying or stacked dielectric sheets 13, 14 is used. Though the honeycomb 12 is illustrated as having dielectric sheets 13, 14 of the same thickness, the thickness of the respective sheets 13, 14 does not necessarily have to be the same. However, the thickness of each of the honeycomb structures of the capacitor assembly 10 is substantially the same in the illustrated embodiments. The walls of the dielectric sheets 13, 14 provide in a sense a static, e.g., unchanging, dielectric as compared to the possibly changing dielectric characteristics of the fluid 20a flowing in channels 20. Although the honeycomb structure 12 is illustrated as having two substantially parallel dielectric sheets, honeycomb structure material with more than two dielectric sheets may be used in the capacitor assembly 10, e.g., three or more spaced apart dielectric sheets, which may be in parallel planar and overlying relation. An example of a tri-wall honeycomb structure 12b useful in a capacitor subunit for a capacitor assembly is illustrated in FIG. 4B having dielectric sheets 13, 14, 13a and ribs 15. Electrodes 16a, 16b are at the exterior surfaces of the exterior dielectric sheets 13, 14. Using tri-wall or even more wall dielectric honeycomb structures provides additional static (unchanging) dielectric for the capacitor assembly 10.

The ribs 15 may be made of dielectric material and may be of the same material used to make the dielectric sheets 13, 14. The ribs 15 may be substantially planar and arranged substantially perpendicular to the sheets 13, 14, as illustrated. It should be appreciated, however, that the ribs 15 may have alternative configurations. For example, instead of ribs 15 configured as illustrated, tubular structures formed from dielectric material may be disposed between the sheets 13, 14. In such a configuration, the interior space of the tubular structures may define a channel 20. The space exterior to the tubes and between the sheets 13, 14 also may serve as channels 20. In yet another contemplated embodiment, a thin dielectric material, may be disposed between the two substantially parallel sheets 13, 14 instead of or in addition to ribs 15. Such dielectric material may be similar to material used to form the sheets 13, 14, or may be another material. Instead of being substantially parallel to the two sheets 13, 14, however, the dielectric material may have a sinus wave shape cross section (similar to corrugated cardboard), a 'zig-zag' shape cross section (similar to the shape of multiple W's), or an alternative configuration. In such a manner, channels 20 may be formed between the sheets 13, 14 in the open areas provided by the ribs and sheets 13, 14. Alternatively, a piece of solid dielectric material could be provided and channels 20 could be drilled or cut in the material.

The ribs 15 tend to hold the sheets 13, 14 relatively uniformly spaced apart and the use of more than two ribs to provide relatively uniform spacing allows for the use of thinner sheets in making relatively large area honeycomb structures 12 than would be possible without more than two ribs. The use of two or more ribs in this configuration also allows for the use of thinner dielectrics or dielectric sheets for a rated voltage of the capacitor. The use of thinner dielectric material for the sheets 13, 14 also may allow for the material to be cooled more easily since the material will have less of a tendency to store heat than thicker sheets and can more easily transmit heat between the electrodes 16 and the fluid 20a, which may remove heat from and, thus, cool the capacitor assembly 10.

Separation of the flow channels 20 from each other may avoid a cumulative heat problem, for example, as follows. Ionization of gas usually occurs more easily at a higher temperature than at a relatively lower temperature, and if the capacitor assembly 10 were to generate heat, heat pockets may form; resistance to fluid flow due to a heat pocket may build in one or more flow channels 20. The fluid may begin to flow around these areas of higher fluid flow resistance and the capacitor assembly 10 may not be cooled evenly and/or efficiently. As heat builds in an area of the capacitor assembly 10, there may be a tendency for corona discharge to occur in that area, further raising the temperature of the fluid and the materials in that area, e.g., the honeycomb and/or the electrodes, and producing ultraviolet light, which degrades plastic and crystallizes glass. Hence, the hot spot area may become prone to material breakdown or thermal failure, for example, crystallization, melting, pitting or burning of the electrodes 16 and/or the honeycomb structure 12. By dividing the volume of air space between the dielectric sheets 13, 14 of a honeycomb structure 12 into multiple flow channels 20 and generally maintaining even fluid flow through the flow passages, the tendency to develop such fluid flow resistance may be decreased and the ability to cool and the efficiency of cooling the capacitor assembly 10 may be increased. The fluid flow in these passages tends to be smooth and relatively turbulence free (laminar-like) which enhances cooling efficiency.

The fluid may be used to exclude ionizable gases from around the electrodes 16 and between the sheets 13, 14 and may be used to cool the capacitor assembly 10 as explained above. The fluid itself may be cooled to facilitate cooling of the capacitor assembly 10. A liquid fluid may be transported or moved by a pump 21a and a gaseous fluid, e.g., air, nitrogen, or some other gas or combination of gases, may be transported or moved by a fan or blower 21 through the channels 20. The fluid also may be transported by convection currents, as is described with respect to FIG. 1C.

As another alternative, the fluid used to cool the capacitor assembly 10 may be recycled. For example, the capacitor assembly 10 may be disposed in a closed case in which a recirculating gas is contained. Dry gas, e.g., a gas that contains relatively little or no water (moisture), may be used, for example, because it has a higher ionization potential than humid air or gas. For example, in air the primary gas constituent that requires the greatest voltage for ionization (ionization potential) is nitrogen, oxygen is second, and water is third. Water acts as an electrical conductor and when it is in the gaseous state facilitates electrical conduction in air; thus to avoid conducting electricity and formation of corona discharge in air (or other fluid) flowing through the channels, it is advantageous to minimize moisture in the air. The air may be dried, e.g., using a silica drying agent, or another gas, e.g., nitrogen that does not contain moisture, may be used. The fluid may be directed through the channels 20 of the capacitor assembly 10, through the case where it may be treated, e.g. cooled, dried, filtered, and electrically grounded to reduce its conductivity and potential to become ionized, etc., and back through the channels 20 of the capacitor assembly. The case may sink heat away from the gas and the capacitor assembly, thereby cooling the entire capacitor assembly 10 and case. Instead of using the case to sink heat, the fluid may be passed through the channels 20 and then through a fluid cooler (e.g., a heat exchanger) before recycling through the channels 20. The case also may provide for electrical grounding to discharge the fluid 20a before being recycled through the capacitor assembly 10 and/or exhausted from the capacitor assembly.

Figure 18:
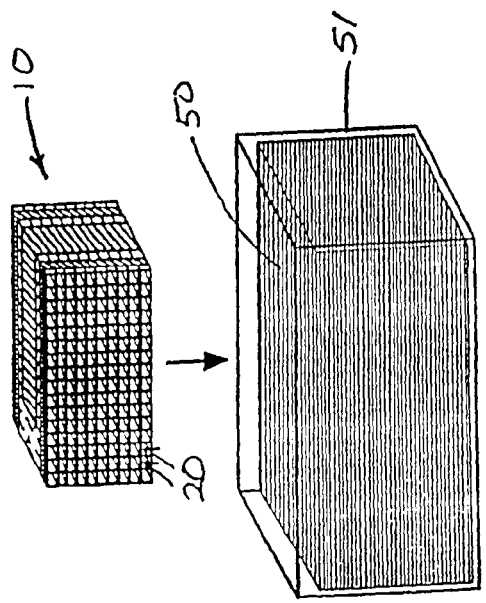
FIG. 18 is a schematic illustration of an alternative method of cooling a capacitor.

Briefly referring to FIG. 18, instead of passing a fluid through the fluid channels 20, the entire capacitor assembly 10 may be placed into a fluid that is not easily ionized (e.g., oil).

Referring now to FIGS. 5, 6A and 6B, a capacitor subunit 11 is illustrated to show an exemplary method of assembling the capacitor subunits 11 to make a capacitor assembly 10. An electrode 16 is disposed at or near a desired sheet 13, 14 of the honeycomb 12. An electrode 16 is disposed such that at least one layer of dielectric sheet 13 or 14 separates the electrode from the flow through channels 20. The electrode 16 may be a conductive foil, as illustrated; and other examples of electrodes include conductive tape, or plating on the surface of the respective dielectric sheet 13, 14. The conductive foil 16 may be made from a metal such as, for example, aluminum, copper, gold, silver, iron, nickel, tin, or other electrically conductive material. Alternatively, the electrode 16 may be a conductive paint containing, for example, metal and/or metal additives, or other electrically conductive material. A non-limiting example of conductive paint is sold under the trademark RUST-OLEUM cold galvanizing that contains 93 percent (93%) zinc. Virtually any electrically conductive material of suitable size and shape may be used for the electrode 16. The electrode may be thin and conformal so it tends to follow irregularities in the adjacent dielectric sheets and minimizes space needed for the electrode between dielectric sheets of respective honeycomb structures.

The electrode 16 may include an adhesive 25 to facilitate attachment to a respective sheet 13, 14 or an adhesive 25 may be located on a sheet and used to adhere the electrode to the sheet. An advantage of using adhesive backed electrically conductive tape is the cushion effect of the adhesive, which helps fill voids and, thus, enhances conformance to irregularities in the dielectric sheet. Instead or in addition to adhesive, the sheets 13, 14 may be provided with mechanical connectors that mechanically engage the electrode or reciprocal connectors on the electrode 16. Alternatively, the electrode 16 may be taped, e.g., using double sided tape, or otherwise fastened in the correct position or held in place by an adjacent capacitor subunit 11. Other possible methods of locating the electrode 16 at a sheet 13, 14 will occur to those skilled in the art and are intended to be included in the scope of the appended claims. In an optimum circumstance, for example, on the one hand the electrode 16 would be between two dielectric sheets of respective capacitor subunits 11, and there would be no voids or space, etc. between the confronting surfaces of those two dielectric sheets; by avoiding such voids or space, the likelihood that corona discharge or electric arc formation there is avoided.

In the illustrated embodiment of FIGS. 5 and 6, for example, the capacitor subunits 11 include a conductive foil used as the electrode 16. The conductive foil 16 includes an adhesive 25 on the surface that contacts a respective sheet 13, 14. The conductive foil 16 may be disposed at a desired sheet 13, 14 with an excess material portion 26 extending beyond an edge 27 (e.g., the tab edge where the tab 18 of the electrode may be exposed) of the honeycomb structure 12 (see FIG. 5)

to provide electrode tab portions 18a, 18b for convenient electrical connection thereof. As seen in FIGS. 6A and 6B, the excess material portion may be folded along the edge 27 of the honeycomb structure with the adhesive 25 facing the edge 27 of the honeycomb structure.

As is seen in several drawing figures, the electrode 16 is positioned in spaced apart relation from three of the side edges 28 of the honeycomb structure 12, as is represented by space 28a, to avoid electrical leakage from one electrode to another electrode around the edge of the honeycomb dielectric 12.

Referring now to FIG. 6B, before the excess material portion 26 (also referred to as "tab portion") contacts the honeycomb structure 12 at the edge 27, a dielectric insulator material spacer 30 may be placed between the honeycomb structure edge (tab edge) 27 and the excess material portion 26 to straddle the two adjacent honeycomb structures 12, as is seen in the drawing figure. The dielectric insulator 30 may be made from any suitable material (e.g., plastic, thermoplastic, glass, clay, ceramic, polymer, etc.). As an example, the dielectric insulator 30 may be cut from a thin (e.g., about 0.127 millimeters or less to about 0.254 millimeters or more thick) sheet of MYLAR® film. Other insulators of the same or different sizes may be used as insulator 30. The dielectric insulator 30 may, for example, reduce the likelihood of unwanted electrical leakage between the tab portion 18 of one electrode and the next adjacent electrode of the opposite polarity, e.g., from the electrode 16 of one capacitor subunit 11 and the electrode 16 of an adjacent capacitor subunit 11.

Instead of folding the excess material portion 26 at this point, a plurality of capacitor subunits 11 may be assembled in overlying relation, e.g., as is seen in FIG. 1A, and the excess material portions 26 may be folded as in FIG. 1B after the capacitor subunits have been assembled together as in the arrangement of tabs 18a, 18b, for example. Alternatively, the excess material portion 26 of some or all capacitor subunits 11 may be folded prior to assembly (stacking) and the excess material portion 26 of some or all capacitor subunits 11 may be folded after stacking to form the capacitor assembly 10.

Each capacitor subunit 11 may be made in the same manner and with the same configuration. This would facilitate production of the capacitor subunits and may help increase overall quality and consistency of the capacitor subunits and the capacitor assemblies 10.

Figure 7A:
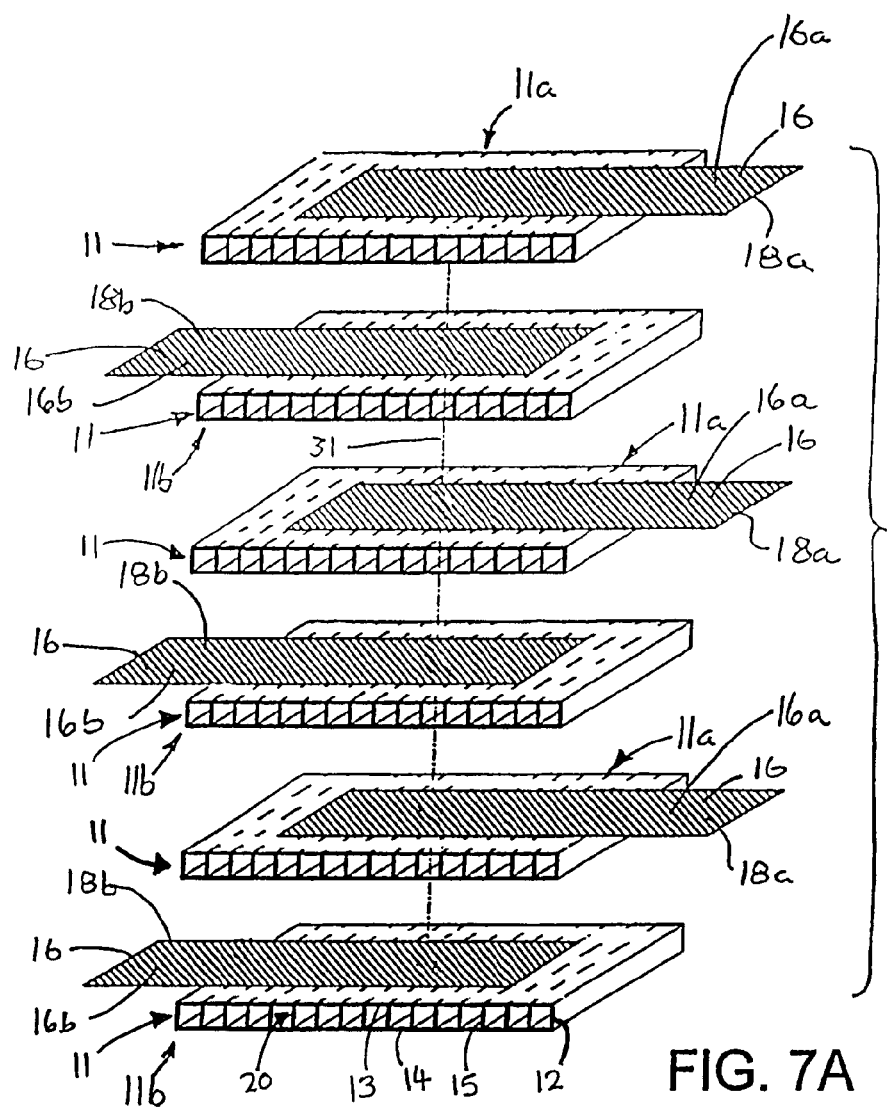
FIGS. 7A and 7B are schematic illustrations respectively showing a number of capacitor subunits aligned to be assembled in a stack and assembled in a stack to depict an exemplary method of assembling capacitor subunits to make a capacitor assembly.
Figure 7B:
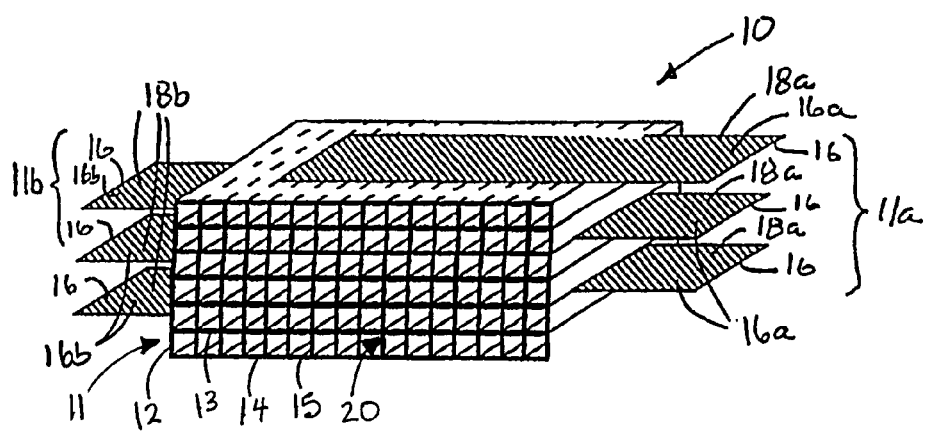

Referring now to FIGS. 7A and 7B, a method of assembling capacitor subunits 11 into a capacitor assembly 10 is shown. It should be noted that some of the following steps may be performed in an alternative order and are set forth in the illustrated order only for convenience of description.

A plurality of capacitor subunits 11 is shown. In the illustrated exemplary capacitor assembly 10, six capacitor subunits 11 are provided. Starting at the top of FIG. 7A, a first capacitor subunit is provided and may be arranged as illustrated. A second capacitor subunit is provided in parallel to the first capacitor subunit but is oriented in reverse direction to the first capacitor subunit, e.g., in a sense rotated 180° (180 degrees) about an axis 31 relative to the adjacent capacitor subunit. Third, fourth, fifth and sixth capacitor subunits 11 are in the same alternate rotational orientation as the first and second capacitor subunits 11. The capacitor subunits 11 are stacked together and are held together to make the capacitor assembly 10. The steps may be repeated until a capacitor assembly 10 of desired characteristics, dimensions and layers is formed (more or fewer than the illustrated six layers) is formed. The stacked assembled capacitor subunits are shown in FIG. 7B prior to folding over or otherwise attaching respective electrodes 16a to each other and electrodes 16b to each other. A piece of honeycomb 12 without an electrode 16 may be placed at the top and/or bottom of the capacitor assembly 10 to function as a top and/or base (not illustrated). Other top and base members may be used, as may be desired.

Thus, it will be appreciated that the respective electrodes 16a and their associated tabs 18a may be exposed at one part of the capacitor assembly 10 and the respective electrodes 16b and their associated tabs 18b may be exposed at another part of the capacitor assembly 10, not in direct electrical connection with the electrodes 16a. In this way it is relatively easy to electrically couple respective electrodes 16a together and to the electrical circuit 19 and respective electrodes 16b together and to the electrical circuit 19.

In the illustrated embodiment of FIG. 1 the capacitor assembly 10 is generally of rectangular cross section and the tabs 18 of respective electrodes are exposed at opposite sides of the rectangle. As also is illustrated in FIG. 14, the tabs 18 of respective electrodes 16 may be exposed at adjacent sides of the rectangular cross section capacitor assembly. Separation of the respective electrodes and their tabs by locating them at different respective sides of the capacitor assembly 10 and by spacing the electrodes 16 from the edges of the dielectric honeycomb may facilitate constructing the capacitor assembly, maintaining electrical isolation of the electrodes 16a from electrodes 16b, and may also provide for enhanced accurate control of the capacitance provided by the capacitor assembly 10. It will be appreciated that although the capacitor assembly 10 is shown in the several embodiments as having a rectangular cross section or footprint, it may have another shape, e.g., a different polygonal cross section or footprint or even a curved cross section or footprint, such as circular, oval, etc.

As shown in FIG. 7B, the channels 20 of capacitor assembly 10 may be similarly oriented to pass fluid through the capacitor assembly 10 in one direction.

As shown in FIG. 8, the channels 20 of capacitor subunits 11 of capacitor assembly 10 may be oriented with some flow channels 20 in different respective directions, e.g. orthogonal directions.

As shown in FIGS. 9 and 10, capacitor subunits 11 may be joined together with a suitable fastening mechanism 32. The fastening mechanism 32 may be, for example, an adhesive (e.g., epoxy, silicone, foam tape, etc.), tape or other material such as one or more straps (FIG. 9), a bolt or screw (FIG. 10), one or more bands of metal or other material (electrically conductive or non-conductive), a clamp, pressure fitting, or other suitable means. The capacitor subunits 11 may be pressed or squeezed together in a stack with an electrode between respective capacitor subunits to make the capacitor assembly in a manner that minimizes the amount of ionizable material between the capacitor subunits 11. By reducing the amount of ionizable material from the space between adjacent capacitor subunits 11, unintended corona generation in that space may be reduced or avoided. An insulator material, e.g. silicone, may be included between the capacitor subunits 11 further to occupy any such space and to reduce the amount of ionizable material, e.g. air, between capacitor subunits. If such insulation material were curable, settable or the like, it may be used to glue, cement, etc., together the stack of capacitor subunits 11 forming the capacitor assembly 10.

Figure 11:
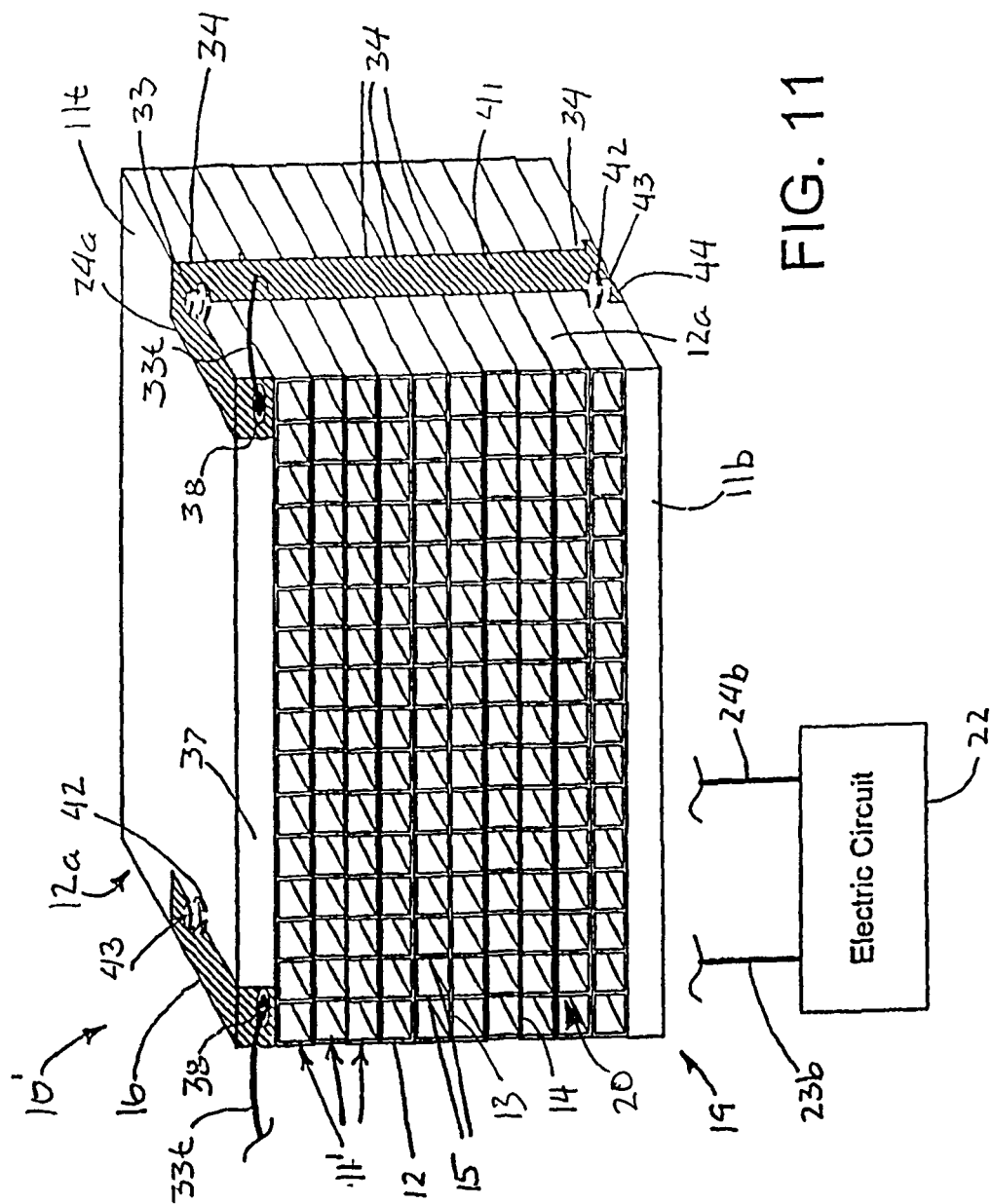
FIG. 11 is an isometric view of a capacitor assembly according to another embodiment of the present invention.
Figure 12:
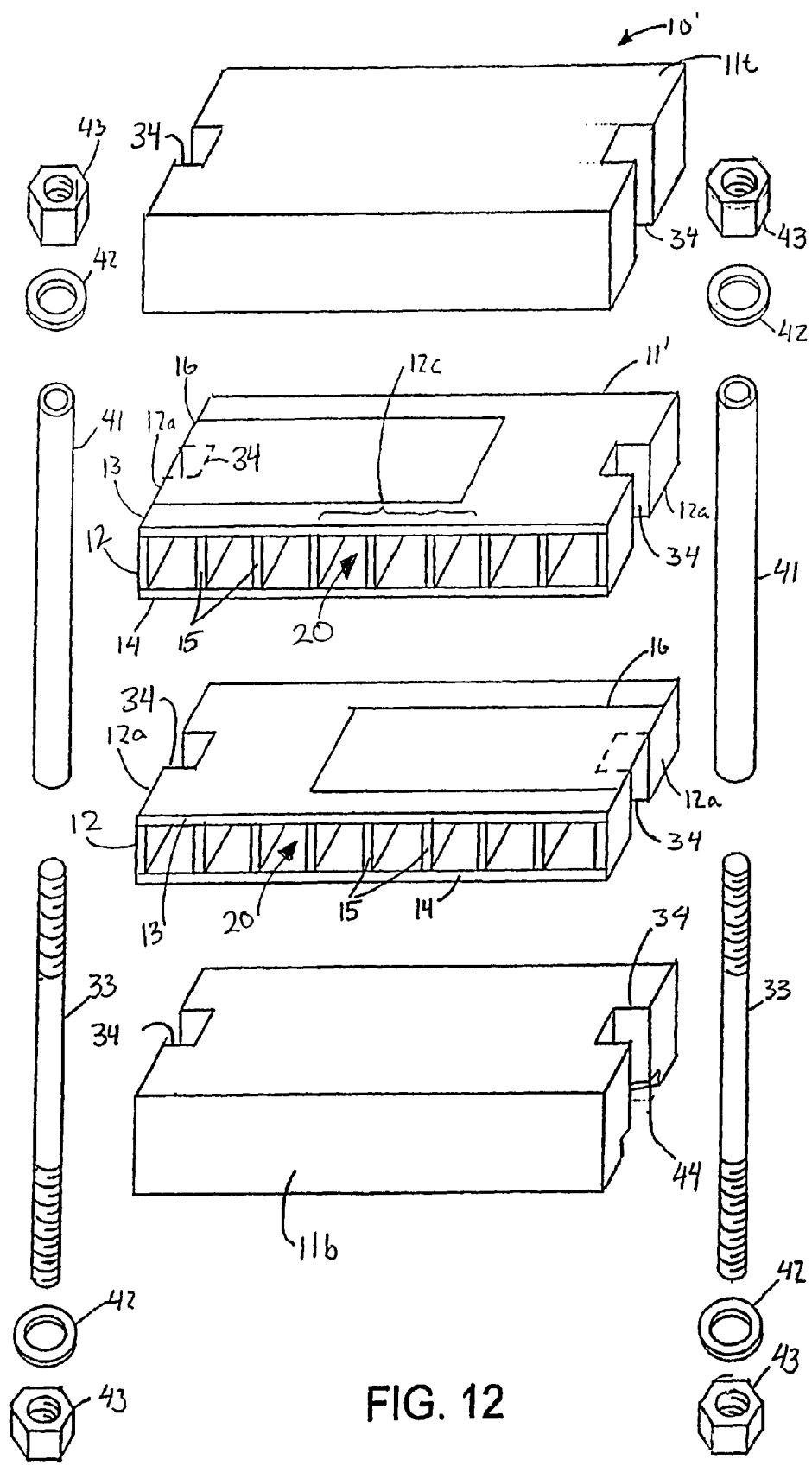
FIG. 12 is an exploded schematic illustration of a capacitor assembly with parts arranged to depict an alternative method of assembling a number of capacitor subunits.
Figure 13D:
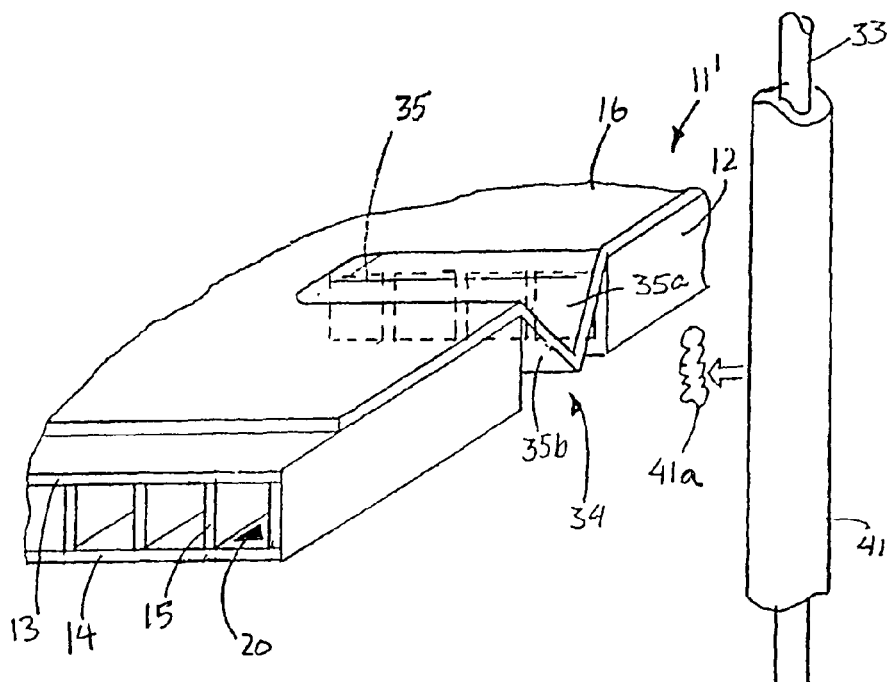

Referring now to FIGS. 11-13, an alternative embodiment of capacitor subunits 11' and capacitor assembly 10' and method of assembling the capacitor assembly 10' are illustrated.

As is seen in FIG. 11, the capacitor assembly 10' includes a number of capacitor subunits 11' that are in stacked relation generally as was described above. As is described in further detail below with respect to FIGS. 11-13, the capacitor subunits 11' are held together between a base member 11b and a top member 11t by a number of rods 33 or other elongate fasteners. In the exemplary embodiment of FIG. 11 there are two rods that are threaded at opposite ends, and a nut that is threaded onto each end holds the rods to the base member and top member with the stack of capacitor subunits 11' pressed or squeezed together between the base member and top member. The rods may be located in notches of the capacitor subunits 11' to tend to restrict lateral movement of the capacitor subunits in the stack of them in the capacitor assembly 10'. Also, the rods may be electrically conductive and may be electrically connected to respective electrodes 16 of the capacitor subunits 11' to provide electrical connections thereof in an electrical circuit 19. For example, one electrically conductive rod may be electrically connected to the electrodes 16a and a different electrically conductive rod may be electrically connected to the electrodes 16b, thereby providing the two polarities of electrical connection for the respective electrodes of the capacitor assembly 10'. Terminal electrodes 33t at the top member 11t of the capacitor assembly 10' may be used to provide electrical connections for the electrically conductive rods to the electrical circuit 19 (FIG. 1).

As shown in FIGS. 11-13, a notch 34 is cut into each side edge 12a of the honeycomb structure 12 at approximately midway along the length of the side edge. "Side edge" in this instance refers to the edges 12a of the honeycomb structure that run parallel to the flow-through channels 20; placing the notch 34 at such side edge 12a avoids obstructing fluid flow through channels 20 at the central area 12c of the capacitor assembly 10' where there may be more heating than at the edges 12a of the capacitor assembly during use. In the illustrated embodiment, the notch 34 is about ¼ inch wide, measured on the side edge 12a of the honeycomb 12, and ½ inch deep, measured from the side edge 12a toward the center area 12c of the honeycomb 12. An electrode 16 is located at a sheet 13, 14 and extends out to the edge 12a of the honeycomb structure, including electrode material extending over the notch 34. The electrode may be an electrically conductive foil, electrically conductive tape, electrically conductive paint, plating, or other material, e.g., as is described elsewhere herein and/or equivalents. A cut 35 in the electrode 16 extends approximately along the depth of the notch 34 and is approximately centered on the width of the notch. Two flaps 35a, 35b of material that are part of the electrode 16 are formed by the cut 35 and may be manually or otherwise depressed slightly into the notch toward the other sheet of the honeycomb structure 12. This depression biases bending or folding of the flaps into the notch to ensure that as the rod is pressed into the notch 34 and the rod and/or an associated sleeve makes electrical connection with the electrode 16, and so that adhesive, which may hold the electrode to the honeycomb structure 12, would not be between the electrode and the rod or sleeve. A number of capacitor subunits 11' and connection of electrodes 16 thereof in the electrical circuit 19 may be made and provided according to this method.

Figure 13E:
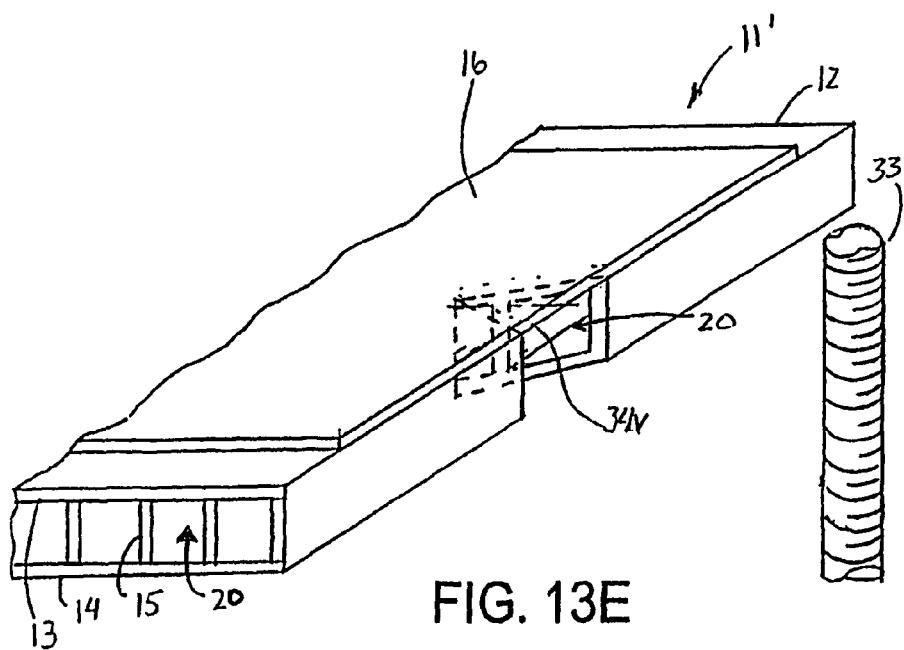

In the embodiment of FIGS. 12 and 13A-13D the notch 34 is rectangular cross section. In the embodiment of FIG. 13E the notch 34v is V-shape. Using a V-shape notch helps to avoid the possibility that the flaps 35a, 35b might be stressed and tear where they are attached to the main body of the electrode material in the area of the notch.

According to the illustrated embodiment of FIGS. 11-13, the capacitor subunits 11' may be assembled in stacked relation between a base 11b and a top 11t to form a capacitor assembly 10'. In the illustrated embodiment, for example, the base and the top are each ½ inch thick polypropylene sheets, but it will be appreciated that other materials and other sizes may be used. Notches 34 are cut or otherwise formed in the base 11b and the top 11t with dimensions substantially similar to the notches 34 in the sheets of honeycomb 12. Each successive capacitor subunit 11' is oriented about 180 degrees (180°) relative to adjacent capacitor subunit 11' so that the electrodes 16 of alternate, e.g., every second, capacitor subunit align in the same direction. A desired number of the capacitor subunits 11' may be stacked in this manner.

After the capacitor assembly 10' components are in their appropriate configuration (orientation), they may be mechanically and electrically connected to form a functioning capacitor assembly 10'. Threaded rods 33 are provided for this purpose. If desired, around at least a portion of the rod 33 there may be placed an electrically conductive engaging material 41. This conductive engaging material may be, for example, a piece of conductive foil or a conductive sleeve. The threaded rod 33 is inserted through the sleeve 41 and the assembly is pushed into the notches 34 formed in the base 11b, the top 11t and the capacitor subunits 11'. As illustrated in FIGS. 13A-13D, as the rod 33 and the sleeve 41 are pushed into the notches, the flaps 35a, 35b of the electrodes 16 are pushed into the notch and make contact with the sleeve. In this way, each capacitor subunit 11' is connected to the sleeve 41. The sleeve 41 and the rod 33 may be selected so that the outer diameter of the threaded rod 33 is approximately identical to the inner diameter of the sleeve 41 for electrical connection therebetween. Hence, the rod and the sleeve will be electrically connected so the rod is electrically connected to each capacitor subunit 11' electrodes 16. The notch may be V-shape, as at 34v to avoid a tendency of the flaps 35a, 35b to tear as they are folded under the force of the inserted rod.

If desired, electrically conductive material 41a, e.g., some slightly crushed aluminum foil (FIG. 13D) or the like, may be inserted in the notch 34 or 34v prior to insertion of the rod and sleeve or just the rod to enhance electrical connection thereof to the electrodes; such electrically conductive material may be further crushed or wedged into the notch as the rod and sleeve or just the rod is forced into the notch.

In the illustrated exemplary embodiment the threaded rod 33 approximately is the same height as the capacitor assembly 10', as shown. A washer 42 and a nut 43 may be attached to each end of the rod 33 to join and hold the capacitor assembly 10' together in operational relation. The rod may be a bolt to hold the stacked capacitor subunits together between the bolt head at one end and washer and nut at the other end. Other devices, such as clamps, rivets, tape, bands, etc., e.g., as are described herein, alternatively or additionally may be used to hold the parts of the capacitor assembly 10' together. The use of rod 33, sleeve 41, washer 42 and nut 43 can be suitably tightened to hold the parts of the capacitor assembly 10' securely together, e.g., to press or to squeeze these together, to tend to minimize air or other fluid in areas where not desired, e.g., between an electrode and the sheet material of a honeycomb structure or between sheet material of respectively adjacent honeycomb materials and between the top and bottom capacitor subunits and the top and base of the capacitor assembly 10'. The capacitor assembly 10' is self-supporting structure even by its own dielectric, e.g., the honeycomb structure, and/or in that the components are retained together as described and also the top and base facilitate supporting the capacitor assembly on a surface, in a case, etc., and stacking of capacitor assemblies, as well as side-by-side placement.

A recess 44 in the base 11b allows for recessing the end of the threaded rod 33, the washer 42 and the nut 43 from the surface of the base and allow for a flat surface on the bottom of the capacitor assembly 10'. In the illustrated embodiment, the recess is formed by making a groove approximately ¼" (one fourth inch) deep and about ⁷⁄₁₆" (seven sixteenths inch) wide across the base 11b in a straight line from approximately the midpoint of one side to the midpoint of the opposite side of the base. The groove is centered over the notches 34 or 34v. Using a groove, instead of a more traditional recess, such as, for example, a wide hole around the washer and nut, allows for lower tolerances since the rod can shift in toward the center of the capacitor assembly 10' (providing improved electrical contact with capacitor electrodes) or out toward the edge without having to adjust the recess location. The recessed nut and bolt allow the base to be flat to rest securely on another surface on which it is placed, if desired.

The rod 33 and, if used, the conductive engaging material 41 are selected so the outer diameter of the rod and engaging material is approximately equal to the width of the notches 34. When the rod and engaging material firmly engage the notch and the capacitor components in stacked relation, no or extremely limited movement is possible in the vertical and horizontal directions, helping to keep the entire capacitor assembly 10' in the illustrated operational configuration. Also, the base 11b and top 11t members protect the capacitor assembly 10' from physical damage, electrically insulate the top and bottom, and may facilitate securing the capacitor assembly 10' in a machine or other support structure, case, etc., without damaging what may be more fragile material of the respective capacitor subunits 11'.

In FIG. 11 at the top 11t are conductive tape or other electrode or electrically conductive members 33t that may facilitate making electrical connections to the respective rods 33. The conductive tape 33t may be adhered to the top surface and to a front edge 37 of the top 11t. The conductive tape 33t is in electrically conductive engagement with the washer 42 and nut 43 of rod 33. Electrically conductive screws 38 may be screwed into the top or front edge 37 of the top 11t through each of the conductive tape members 33t to serve as a terminal connection for wires 23a and 24a for connection of the capacitor assembly 10' in the electrical circuit 19

Referring now to FIGS. 14-17, various features of the capacitor assemblies 10, 10' and components thereof are shown. These features may be employed in the described and illustrated embodiments as well as equivalent structures.

As shown in FIG. 14, alternative placement configurations are possible for an electrode 16 at a sheet 13, 14 of a honeycomb structure 12. In FIG. 14, the electrode 16 of one capacitor subunit 11 is oriented about 90 degrees (90°) relative to the electrode 16 of a second capacitor subunit 11. The capacitive effect of a capacitor assembly 10 made from the two illustrated capacitor subunits 11 would be substantially similar to the effect created by two capacitor subunits 11 assembled according to the method described above with respect to FIGS. 5 and 6A, for example.

As shown in FIG. 15, alternative electrode 16 patterns are possible. In FIG. 15, the electrode 16 is provided with a relatively narrower connection tab 46 than the relatively wider main part of the electrode 16 that provides input via the honeycomb to the fluid 20a in the channels 20. A relatively narrow tab 46, or a similar configuration, may be beneficial to simplify electrical connection of the capacitor assembly 10 to avoid obstructions external of the capacitor assembly 10. Alternatively, there may be no excess material portion 26 and instead the tab 46 may be replaced by a wire electrically connected to the electrode 16 of desired capacitor subunits 11 and may extend for electrical connection to an electrical circuit.

As shown in FIG. 16, the fastening mechanism 32 may include the use of a conductive bolt or screw 32s that pierces through the electrode 16 on the honeycomb structure 12 and electrically connects to the electrode 16. In this manner, the fastening mechanism 32 may be used to electrically connect the electrodes 16 of a desired number of capacitor subunits 11. For example, a long screw 32s may be used to connect all of the capacitor subunits 11 of a capacitor assembly 10 and in particular provide electrical connection to desired electrodes 16. Electrical connection of the electrodes in an electrical circuit 19 (FIG. 1) may be provided via the screw 32s; the screws act as terminals 23a, 24a of FIG. 1. In operation a charge may be applied to the electrodes 16a, 16b directly via the screws 32s. In FIG. 16, the electrodes 16 may be electrically conductive paint, electrically conductive plating, etc. Such an electrode material may be used in other embodiments hereof. As shown in FIG. 16, the screw 32s pierces and electrically connects with electrically conductive paint 16 to create an electrical connection between the screw and the conductive paint.

Figure 17:
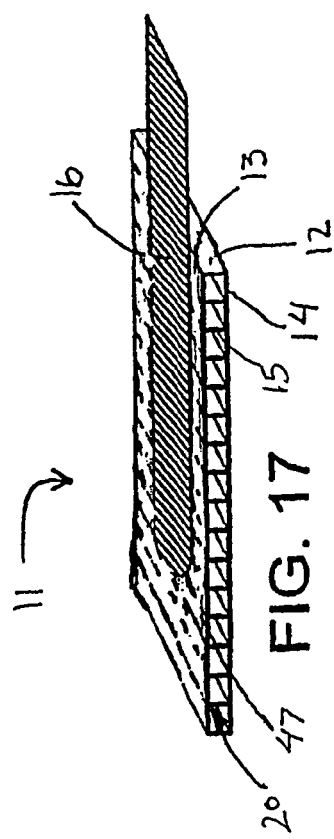
FIG. 17 is an isometric view of a capacitor subunit having a shaped conductive electrode.

In FIG. 17, the electrode 16 is provided with a rounded edge 47. Corners create electrical stress points. By eliminating corners on the electrode 16, high electrical stress points may be reduced and the possibility for occurrence of undesired corona discharge may be reduced.

As shown in FIG. 18 and as explained above, a capacitor assembly 10 may be placed in a fluid 50 for cooling and/or to exclude ionizable fluid from the capacitor assembly 10. In FIG. 18, a capacitor assembly 10 is placed into a container 51 of oil 50. The oil enters the passages 20 and may be selected to have a desired effect on the capacitance of the capacitor assembly, too.

Figure 19:
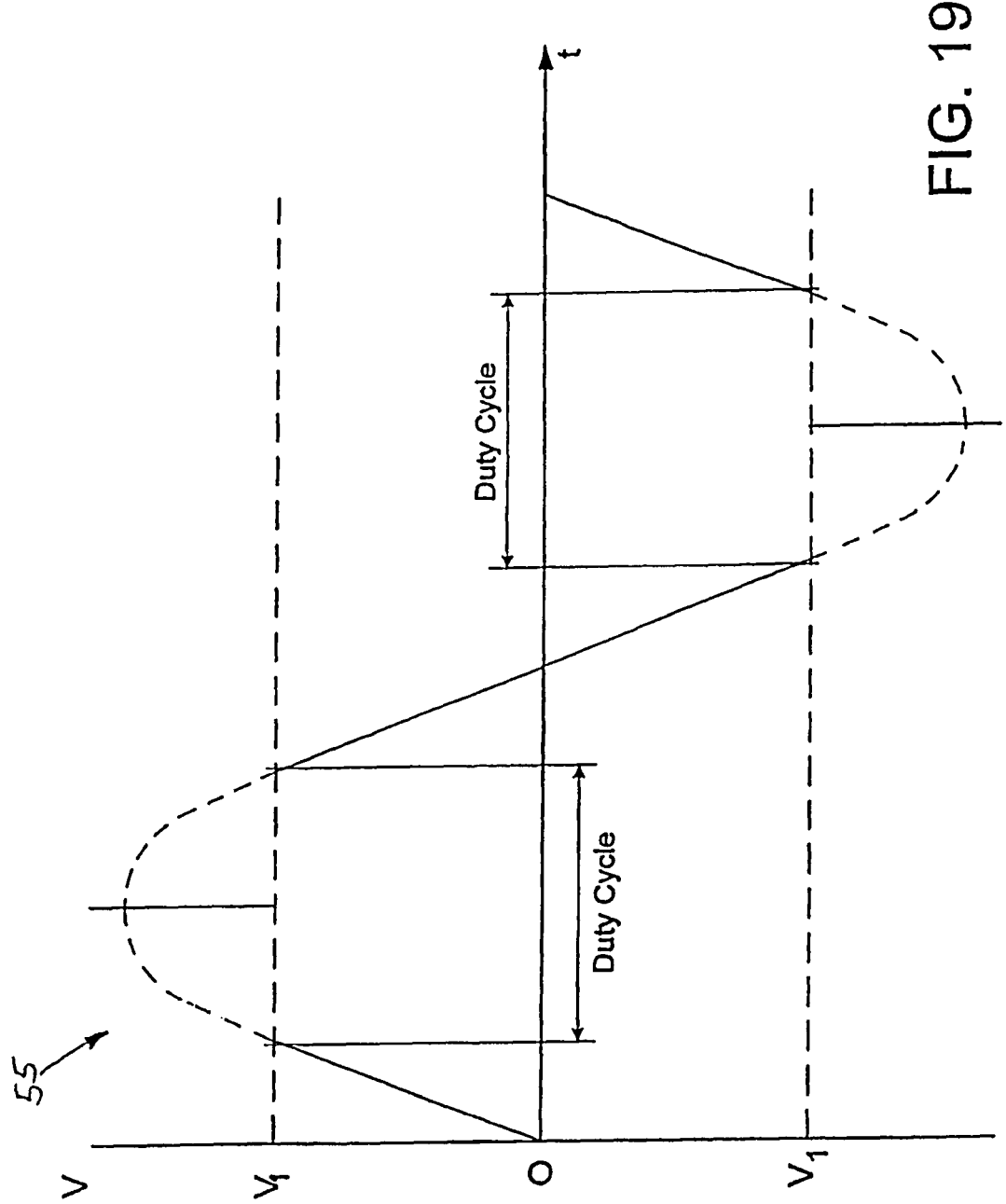
FIG. 19 is a representation of an AC electrical voltage input to a capacitor as a function of time indicating an example of a portion of the voltage input having a magnitude that exceeds the break down voltage level of the fluid coolant used in the capacitor.

Referring now to FIG. 19, a chart (graph) 55 illustrates voltage as a function of time of a functioning capacitor assembly 10, 10'. A high voltage from an AC voltage source, e.g., which may be part of the electric circuit 22 (FIGS. 1 and 20) or another voltage source (not shown) is applied to the capacitor assembly. FIG. 19 depicts one full cycle of operation of the voltage v: as the voltage v rises from 0, the capacitor assembly begins to store energy. When the voltage v is approximately equal to the break down voltage $v_1$ of the cooling fluid 20a, e.g., air or other fluid (referred to below as "break down voltage"), the capacitor could generate a corona discharge in the cooling fluid. Corona discharge may continue in the cooling fluid until the applied voltage v drops below the break down voltage $v_1$. If the intersections of the applied voltage v and break down voltage $v_1$ lines shown in the drawing are projected onto the time axis t, the time during which the capacitor assembly could generate a corona in each half cycle of the AC input voltage to the capacitor assembly may be calculated and is shown in the chart. Duty cycle is the time per half cycle of the AC input voltage that the capacitor assembly could generate a corona. It is noted that as shown in the illustrated chart, there are two duty cycles in each cycle of the AC input voltage.

The capacitor assembly 10, 10' may function as a capacitor or as an ionizer, which may, be determined by adjusting the flow rate of air (or other fluid) flowing through the flow channels 20. Whether the capacitor assembly 10, 10' functions as a capacitor or as an ionizer may be determined by adjusting the flow rate (one complete replenishment of air in the flow channels 20) relative to the duty cycle. The time it takes for one complete replenishing of air (or other fluid) in the flow channels also may be referred to as the residence time. If the flow rate is approximately equal to or greater than the duty cycle, the unit 10, 10' functions as a capacitor by blowing out the electrical arc or corona discharge, e.g., because the electrical arc or corona discharge or the start of fluid breakdown and, thus, the tendency to create an electrical arc or corona discharge in the fluid quickly is blown out of the flow channels 20. If the flow rate is less than the duty cycle, the unit 10, 10' functions as an ionizer by creating a corona discharge and, thus, ionizing the fluid or at least some of the fluid in the flow channels 20.

Other factors that may determine whether the capacitor assembly functions as a capacitor or as an ionizer may include, for example, voltages, duty cycle, and/or frequency of the input power supply to the capacitor assembly, the thickness of the honeycomb 12, the material of which the honeycomb is made, the dielectric characteristics of the honeycomb and/or the fluid 20a, the material used for the electrodes 16, and possibly other factors.

Figure 20:
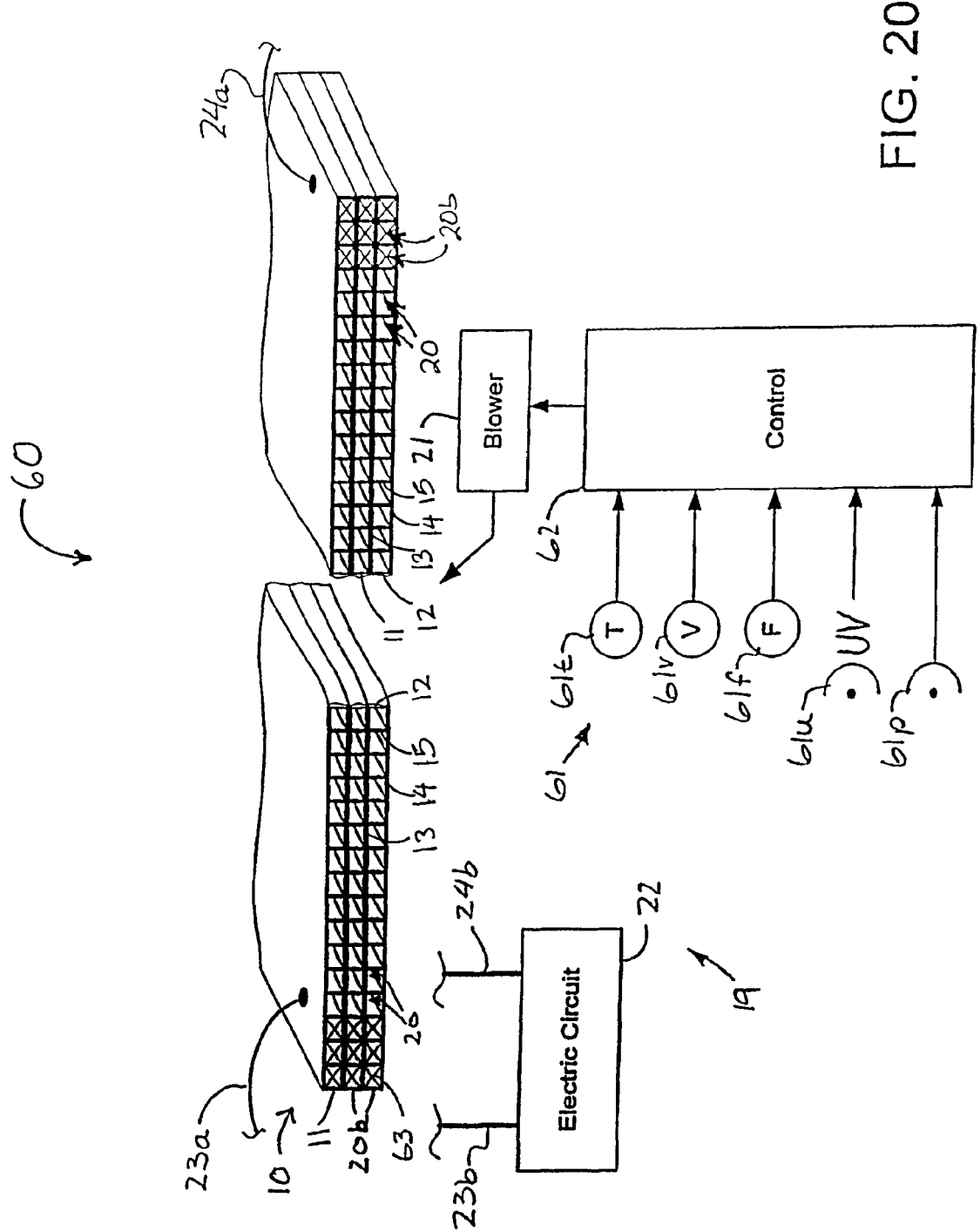
FIG. 20 is a schematic illustration of a capacitor in which a number of flow-through channels are blocked and also showing an exemplary control and blower.

Referring now to FIG. 20, a fragmentary view of a capacitor assembly 10 in a capacitor system 60 is illustrated. The capacitor system 60 includes the capacitor assembly 10, blower 21, sensors 61, and control 62. Several of the fluid flow channels 20b are blocked by suitable blocks, e.g., sheet material, putty, clay, or other material 63 to block air or other fluid from being blown therethrough by the blower 21 if those flow channels are not needed for cooling and the electrodes 16 do not overlie those flow channels. As the blower 21 blows air or other fluid (or as a pump 21a (FIG. 1) pumps fluid), through the unblocked channels 20, such flow is directed to the area of the capacitor assembly 10 where the capacitors 17 are formed and where the fluid may be more needed to provide cooling effect than areas where there is substantially no capacitance, e.g., where electrodes of adjacent capacitor subunits 11 or 11' do not have overlap of respective electrodes.

As is illustrated schematically in FIG. 20, the sensors 61 include a temperature sensor 61t, voltage indicator, voltmeter or the like 61v, and frequency sensor 61f. If desired, the voltage indicator 61v may be a device that sets the voltage at which the capacitor assembly 10 is operated or may be a device that measures the voltage across the capacitor assembly 10, for example, as it is in use in an electrical circuit 19 (FIG. 1). Similarly, the frequency sensor 61f may be a device that sets the frequency at which the capacitor assembly 10 is operated or may be a device that measures the frequency of the electrical input to the capacitor assembly 10, for example, as it is in use in an electrical circuit 19 (FIG. 1). The sensors also may include one or more light sensors, such as a photosensor, photocell or other visible light sensor 61p and a photosensor 61u for sensing ultraviolet light (also referred to as ultraviolet radiation).

The control 62 may be a digital control, computer, other electronic circuitry, programmed logic device, etc. to determine operation of at least part of the capacitor system 60, for example, as is described below. It will be appreciated that the description with regard to FIG. 20 may be applied similarly to the other embodiments and illustrations herein. For example, although the description pertains to use of a blower 21 for blowing air, it will be appreciated that the blower may blow other gas, vapor, or other fluid and/or the pump 21a may be operated similarly with regard to a fluid, whether liquid, gas, vapor, etc.

It is possible that during operation of the capacitor assembly 10, as is illustrated in FIG. 20, there will be the occurrence of an electrical effect, such as corona discharge, electric arc or possibly the tendency to cause ionization of the fluid in the fluid flow channels 20. Such electrical effect may have one or more deleterious affects on the capacitor assembly 10; several of these, for example, include generating ultraviolet radiation (light) or generating heat. These may cause degradation of material of which the capacitor assembly 10 is made or the overall system or device in which the capacitor assembly 10 is used. Also, the generating of heat may waste energy due, for example, to the energy used to create the heat and/or the energy needed to provide cooling.

In operation of the capacitor assembly 10, as is illustrated in FIG. 20 (and also in other drawing figures also as capacitor assembly 10', for example), the capacitor assembly is electrically connected in the electrical circuit 19 to receive electrical charge and to function as an electrical capacitor. The blower 21 blows air through respective fluid flow passages 20 to cool the capacitor assembly. The blower speed and/or the volume of cooling air and/or the flow rate of the cooling air may be controlled by the control 62 that controls operation of the blower speed, output volume, etc. The temperature sensor 61t may be strategically positioned relative to the capacitor assembly 10, e.g., at the capacitor area 17, at the outlet of one or several flow passages 20, or at some other location to detect the temperature of the capacitor assembly or a temperature representative of the capacitor assembly, thereby to determine in effect the heating that is occurring during operation. The control may respond to such temperature detection and, accordingly may be programmed to effect appropriate operation of the blower 21 to maintain a given temperature, to avoid exceeding a maximum temperature, to effect a given amount of cooling, etc. For example, if the detected temperature were to exceed a predetermined level, the blower 21 may be operated by the control 62 to increase the cooling of the capacitor assembly 10. As was mentioned above, corona discharge, electrical arcing, and ionization tend to occur more easily at higher temperatures than at lower temperatures, and the occurrence thereof may tend to cause a further temperature increase of the capacitor assembly 10. By increasing the cooling of the capacitor assembly 10, the extent of such corona discharge, arcing and/or ionization can be decreased as will be their contribution to heating. As the temperature decreases, the control 62 may reduce the blower output speed, air flow output, etc. and, thus, reduce power requirements of the capacitor system 60.

In the present invention, if it were desired to eliminate ionization of fluid in the flow passages 20 or at least to try to reduce or to minimize the occurrence of such ionization, the blower output 21 may be adjusted manually or automatically by the control 62 to ensure that the flow rate of fluid in the flow through channels 20 would be relatively fast so that any electrical arc, corona discharge or ionization that would tend to occur in the channel would be quickly blown out of the channel. As an example, since the electrical input to the capacitor assembly 10 ordinarily would be an alternating current (AC) voltage of a given frequency, ionization of fluid in the channels 20 could be minimized or avoided by using a flow rate through the channels that is at least as fast as or faster than the duration of the duty cycle of the AC voltage. According to this example, if the AC signal were at 60 Hertz, one half cycle requires about eight milliseconds; and if the duty cycle were a duration of about one half of each half cycle of the input voltage, then the flow through the channels 20 would be at a speed that takes approximately less than 4 milliseconds to change the air in each channel or faster. This fast speed of flow represents the residence time for fluid in the channels, and tends to minimize the exposure of fluid in the channels 20 to a voltage that is at or above the breakdown voltage of the fluid.

With further reference to FIG. 20, the voltage detector 61v may be used to detect the voltage being applied to the capacitor assembly 10 and to provide an input to the control 62 to adjust the blower 21 according to the detected voltage. For example, a higher voltage ordinarily would cause increased heating and, thus, the desire for increased fluid flow provided by the blower. Still further, if the voltage detector 61v were instead a voltage setting device to limit the voltage drop across the capacitor assembly 10, that voltage setting could be provided to the control 62 to provide desired operation of the blower to provide fluid output according to the given voltage setting. Similarly, the frequency detector 61f may be used to detect frequency of the signal on the capacitor assembly 10, e.g., in an inductor capacitor resonant circuit or in some other circuit. Usually heating in a capacitor increases with increased frequency; and the blower 21 may be controlled by the control 62 according to either detected frequency and/or according to the set frequency (the latter if the frequency detector were used to set the frequency of the signal applied to the capacitor assembly 10). The occurrence of corona discharge or electric arcing in the capacitor assembly 10 would tend to create visible light or ultraviolet light. The light sensors 61p, 61u may sense the occurrence of such light and provide an input to the control 62 to cause it to operate the blower 21 to increase flow through the channels 20 to reduce such electric arcing or corona discharge, and then the amount of such light likely would decrease, the decrease would be detected by the sensors 61p and/or 61u, and the control may accordingly operate the blower 21 to reduce flow output. The control 62 may be programmed, set adjusted, etc. to respond to inputs from the various sensors and/or by a user to adjust fluid flow to provide desired operation of the capacitor assembly as a capacitor or as an ionizer and to determine various operating parameters, e.g., voltage, frequency, cooling, operating temperatures, etc.

Briefly referring to FIGS. 21 and 22, a capacitor assembly 70, which is similar to the capacitor assemblies 10, 10', etc., described herein, includes a single honeycomb structure 12, electrodes 16 and top 11t and bottom 11b. Operation may be as was described above. The honeycomb structure 12 is used as a structural member by which the capacitor assembly 70 may be attached to another supporting mechanism 71 from which the capacitor assembly is mounted. For example, in FIG. 21 screws 72 and standoffs 73 may be used to space the honeycomb structure 12 from the supporting mechanism. Thus, the honeycomb structure 12 has adequate strength to provide support of the capacitor assembly from the supporting member 71. Being mountable as represented in FIG. 21, the capacitor assembly 10 can be placed in many different locations for various uses to provide the desired functions thereof. In FIG. 21 the honeycomb structure 12 is oriented laterally, e.g., generally parallel, with respect to the surface 74 of the wall 71 or other supporting mechanism. In FIG. 22 the honeycomb structure 12 is suspended vertically from the supporting mechanism 71 using a bracket 75 and screws 76. Although FIGS. 21 and 22 show only a single honeycomb structure 12 and associated electrodes 16, it will be appreciated that the capacitor assemblies shown may include a stack of capacitor subunits 11, 11', etc., as was described above; and the honeycomb structures thereof may provide the structural support member, as was described just above, for the capacitor assembly.

Although the invention is shown and described with respect to certain illustrated embodiments, equivalent alterations and modifications will be obvious to others skilled in the art as they read and thus come to understand this specification and the annexed drawings. Dimensions, materials, weights, etc., described herein are only exemplary and others may be used in the cases provided in accordance with the invention. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiment of the invention. In addition, while a particular feature of the invention may have been disclosed with respect to only one of the several embodiments, such features generally can be combined with one or more other features of any other embodiment as may be desired and advantageous for any given or particular application.

Although particular embodiments of the invention have been described in detail, it is understood that the invention is not limited correspondingly in scope, but includes all changes, modifications and equivalents coming within the spirit and terms of the claims appended hereto.

What is claimed is:

1. A capacitor, comprising:
a pair of dielectric sheets,
one or more fluid channels between the sheets generally parallel to the sheets,
electrodes respectively at each sheet separated from the channels as not to contact fluid therein and supported by respective sheets, and
wherein the electrodes are oriented in parallel and the sheets and fluid in the channels are a dielectric between the electrodes of the capacitor.

2. The capacitor of claim 1, wherein the fluid flows through the channels to cool the capacitor.

3. A capacitor, comprising:
at least two electrodes,
at least two dielectric sheets,
at least one flow through channel between the sheets generally parallel to the sheets, the at least two electrodes on and separated by the at least two dielectric sheets;
wherein the dielectric sheets and at least one flow through channel form the dielectric of said capacitor.

4. An assembly, comprising:
at least two dielectric sheets,
at least one flow through channel between the sheets generally parallel to the sheets, and
an electrical conductor associated with one of the sheets and separated from the channel by that sheet for cooperation with another electrical conductor as a capacitor,
wherein a pair of said dielectric sheets and the flow channel therebetween form a honeycomb structure, and said flow channel comprising a number of flow channels in said honeycomb structure between said pair of dielectric sheets.

5. The assembly of claim 4, comprising a stack of said honeycomb structures and said electrical conductor comprising an electrical conductor between respective adjacent honeycomb structures in the stack.

6. The assembly of claim 5, further comprising a securement to hold the honeycomb structures and electrical conductors in positional relation in the stack.

7. A method of operating a capacitor having a number of electrodes separated and supported by dielectric sheets that are spaced apart by dielectric ribs providing fluid flow passages between the dielectric sheets and extending generally parallel with the dielectric sheets, wherein alternating current voltage is applied to the capacitor, comprising directing a cooling fluid flow through the fluid flow passages.

8. The method of claim 7, wherein said directing a cooling flow comprises directing such flow at a rate to tend to inhibit corona formation.

* * * * *

UNITED STATES PATENT AND TRADEMARK OFFICE
CERTIFICATE OF CORRECTION

PATENT NO. : 8,625,253 B2  Page 1 of 1
APPLICATION NO. : 12/524411
DATED : January 7, 2014
INVENTOR(S) : Paul R. Goudy, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this
Twenty-second Day of September, 2015

Michelle K. Lee
*Director of the United States Patent and Trademark Office*